United States Patent
Underwood et al.

(10) Patent No.: US 12,184,684 B2
(45) Date of Patent: Dec. 31, 2024

(54) METHODS AND SYSTEMS FOR GENERATING RECOMMENDATIONS BASED ON THREAT MODEL KNOWLEDGE GRAPHS COMPRISING CROWDSOURCED MODELING CONTRIBUTIONS

(71) Applicant: Capital One Services, LLC, McLean, VA (US)

(72) Inventors: Jonathan Underwood, McLean, VA (US); Neil Barlow, McLean, VA (US); Fraser Richard Scott, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 586 days.

(21) Appl. No.: 17/542,185

(22) Filed: Dec. 3, 2021

(65) Prior Publication Data

US 2023/0179622 A1    Jun. 8, 2023

(51) Int. Cl.
*H04L 9/40* (2022.01)
*H04L 41/14* (2022.01)
*H04L 41/16* (2022.01)

(52) U.S. Cl.
CPC .......... *H04L 63/1433* (2013.01); *H04L 41/14* (2013.01); *H04L 41/16* (2013.01); *H04L 63/1441* (2013.01); *H04L 63/20* (2013.01)

(58) Field of Classification Search
CPC ............. H04L 63/1433; H04L 63/1416; H04L 63/1441; H04L 41/14; H04L 41/16; H04L 41/145; H04L 43/16; G06F 21/577; G06F 2221/034; G06F 16/2358; G06F 21/56; G06N 3/08; G06N 20/00
See application file for complete search history.

(56) References Cited

U.S. PATENT DOCUMENTS

| | | | |
|---|---|---|---|
| 10,887,333 B1* | 1/2021 | Pereira | G06F 21/55 |
| 2020/0202184 A1* | 6/2020 | Shrestha | G06F 16/9024 |
| 2022/0375226 A1* | 11/2022 | Shrestha | G08B 13/19671 |

* cited by examiner

*Primary Examiner* — Hitesh Patel
(74) *Attorney, Agent, or Firm* — Foley & Lardner LLP

(57) ABSTRACT

The methods and systems relate to improvements to threat modeling systems through the use of crowdsourcing. Specifically, the methods and systems relate to generating recommendations based on crowdsourced threat modeling contributions. For example, the methods and systems automate the threat modeling process by leveraging data in order to drive consistent and measurable quality of threat models and enable threat models to provide aggregated views of risk concentration at any altitude.

20 Claims, 14 Drawing Sheets

400

| Threat Modeling System Node Data Structure |
|---|
| Software Architecture |
| Data Flow |
| Threat |
| Mitigation |

450

| Threat Modeling System Node 1 |
|---|
| Android |
| Simplex |
| Phishing |
| Multi-factor authentication |

470

| Threat Model Contribution Node |
|---|
| iOS |
| Half-Duplex |
| SQL injection |
| Patch application |

| Threat Modeling System Node Data Structure |
|---|
| Software Architecture |
| Data Flow |
| Threat |
| Mitigation |

450

| Threat Modeling System Node 1 |
|---|
| Android |
| Simplex |
| Phishing |
| Multi-factor authentication |

470

| Threat Model Contribution Node |
|---|
| iOS |
| Half-Duplex |
| SQL injection |
| Patch application |

| Threat Modeling System Model Structure |
|---|
| Last Update |
| Review Status |
| Coverage |
| Contributor Characteristics |

550

| Threat Model Structure 1 |
|---|
| 20 November 2020 |
| Incident response; Security analysis |
| Ransomware; Denial of Service attack |
| 10 years experience |

570

| Threat Model Structure 2 |
|---|
| 03 March 2021 |
| Automation/devops |
| Malware |
| PhD |

FIG. 5

METHODS AND SYSTEMS FOR GENERATING RECOMMENDATIONS BASED ON THREAT MODEL KNOWLEDGE GRAPHS COMPRISING CROWDSOURCED MODELING CONTRIBUTIONS

BACKGROUND

Threat modeling of computer applications (e.g., systems, infrastructure, services, software) is a process by which potential threats, such as potential structural/architectural vulnerabilities and/or the absence of appropriate safeguards and controls, are identified, enumerated, and suitable mitigations identified. The purpose of threat modeling is to provide technical professionals and cyber security personnel with a systematic analysis of what controls and/or defenses need to be included, given the nature of the system, the most likely attack vectors for a cyberattack, and/or the assets most desired by the cyber attacker. For example, during threat modeling, users examine representations of software systems such as architecture diagrams, dataflow diagrams and user journey maps in order to establish and mitigate software design anti-patterns that could otherwise expose risk to business and technical capabilities. Threats are considered with respect to a broad range of risk including risk to data confidentiality, integrity and availability, service availability, regulatory compliance and reputation.

The threat model for an application may include consideration of a number of factors. A first factor may relate to business risk such as business capability and operational risk (e.g., what business capabilities are provided by the application that would be at risk if any of the identified threats are realized). A second factor may relate to technical risk such as technical capability risk (e.g., what technical capabilities are provided by the software application that would be at risk if any of the threats are realized), which may include determining a "blast radius" exposed by the application, other applications/services that this application depends on, other applications/services that depend on this application, and the technical environment that the application is deployed into. Other factors may include data assets leveraged or created by the application, availability and performance requirements of the service, legal, compliance and regulatory requirements for the application, and/or the cyber security landscape (e.g., the attack tools, techniques, and processes that potential adversaries may employ, and the motivations that adversaries may have).

These factors define security objectives that should be met for the application. Accordingly, the process of creating a threat model involves combining the expertise of software and infrastructure engineers, cyber security and risk subject matter experts, business and product owners, and architects in order to identify potential threats against those security objectives, and mitigation actions and controls that should be implemented to prevent those threats. Threat modeling provides a framework for collaborative risk discovery and management that leverages and combines the expertise of the different business, technical, risk and cyber stakeholders of the application, and provides an effective means to introspect the security impact and implications of (i) software design; (ii) business processes; (iii) architectural decisions; and (iv) assumptions. Threat modeling is applied throughout the Software Development Lifecycle (SDLC), from early design through to production, in order to drive the right security outcomes, prioritization.

Additionally, threat models, once created, must be continuously maintained and improved as the application evolves functionality and the business, technical, cyber, legal and regulatory contexts of the application evolve. Threat models also provide vital risk context that can be consumed and leveraged in order to drive prioritization decisions with the aim of optimal risk reduction. For example, (i) threat models may be used by engineers and product owners to understand what changes to the software they should make to reduce risk; (ii) threat models may be integrated into vulnerability analytics to identify the high priority areas and applications where vulnerabilities pose the greatest risk; (iii) threat models may provide a key source of information that can drive the definition and implementation of detective alerts and controls for threats as well as defensive controls such as firewalls and Web Application Firewalls (iv) threat models may also provide key context for driving the focus in examinations by second line and audit; and (v) threat models may provide application security testers, penetration software testers, and red teams with key areas of focus in order to optimize their investigative resources.

SUMMARY

Conventional threat modeling systems are structured around one of four independently applied approaches such as an entity-centric, asset-centric, attacker-centric, or hardware/software-centric. For example, conventional threat modeling systems typically facilitate the creation of separate threat models for each application domain by teams associated directly with that domain. This results in threat models which are limited in their quality and coverage by the cyber security and threat modeling knowledge of the personnel associated with the application domain. These threat modeling systems do not readily facilitate the re-use and transfer of knowledge from one application domain threat model to other threat models. Threat models created in this way require significant time and cost for their creation, much of which is spent on duplicative activity across different application domains due to the absence of knowledge sharing across the individual threat model data silos.

Using one of these approaches, conventional threat modeling systems organically build specific components on top of one of these existing approaches. For example, "components" of a threat model may include portions of the threat model that provide modeling for a specific domain application, address specific threats, relate to particular mitigation techniques, provide a specific function and/or are otherwise distinct from other portions of the threat model. During this organic building process, the system uses preexisting references, taxonomies, system referrals, and/or functional implementation to incorporate new components into the existing threat model. For example, creating threat models requires the synthesis of technical, business, cyber security and risk knowledge.

The specialized knowledge required to create threat models causes threat models to be developed by isolated teams through iterative and/or organic (and often manual) creation as each model component requires significant time and resources from the isolated team that is familiar with the existing approach and systems. In addition, when threat models are created manually from an isolated team, it is very difficult to ensure that threat models are of a consistent high quality as the quality and utility of the threat model is determined entirely by the level of cyber security knowledge within the team. Similarly, threat models created by an isolated team, while providing a view into risk concentration within a threat model, are not easily compared in order to provide views of risk concentrations across domains. Without the ability to consume and leverage threat models to create views of risk concentration, much of the value of threat modeling remains unlocked.

Moreover, the threat models facilitated by conventional threat modeling systems do not readily allow threat models to be meaningfully connected and aggregated across application domains. As a result, in conventional threat modeling systems, threat models cannot be readily combined to provide views of risk concentration across multiple, often interdependent application domains. This greatly reduces the value that could be obtained from threat modeling as a risk discovery and management framework.

However, extra value from threat modeling would be obtained if individual threat models could be combined to compose a single aggregated view of risk for applications in a business unit or across business units in an organization. Further value would be obtained if threat model data could be sliced and aggregated in order to understand where risk of a specific class of threats is concentrated. That is, additional value could be derived from threat models if they could be combined and aggregated (e.g., be composable). For example, when threat models are composable in this manner, threat models may be composed at different "altitudes" in an organization in order to facilitate risk management at different levels of management structure.

Conventional threat modeling systems focus on threat model data entry and capture for each software application domain. The need for each threat model to have sufficient role-based access control coupled with traditional relational data model used for storing the threat model data inhibits the re-use of data outside of each threat model's data silo. This prevents the maximal use of the data that is available within the system for automation and composability of threat models and prevents crowdsourcing and amplification of cyber security and threat modeling knowledge entered into the system by users.

On the other hand, traditional crowdsourcing approaches where all users have access to all data entered into the platform would be inappropriate for a threat modeling system. Threat models themselves are highly sensitive data, with high value for a cyber attacker, and so it is usually essential to maintain strict access restrictions to the actual threat models. In addition, security concerns aside, the large volume of data on such a crowd sourced platform would present a discoverability challenge for users if they were required to manually examine all the data in order to identify relevant information. These fundamental problems have, to date, prohibited the use of crowdsourced data for threat modeling.

Accordingly, methods and systems are described herein for improvements to threat modeling systems that leverage all data available on the system without compromising data security within the system or overwhelming users with large volumes of data. Specifically, the methods and systems relate to generating automated threat modeling recommendations to the user based on crowdsourced threat modeling contributions. For example, the methods and systems automate much of the threat modeling process by leveraging data in order to drive consistent and measurable quality of threat models and enable threat models to provide aggregated views of risk concentration at any altitude.

However, even after the reasons for the limitations in conventional crowdsource platforms are realized, numerous technical challenges remain in order to implement crowdsourced threat modeling systems that relate to data consumption and re-use, and threat modeling automation. In order to facilitate automation of threat model creation based upon the data entered into the system, a fully semantic data model may be employed in order to enable user entered data to be meaningfully applied across different threat model application domain contexts. To address these technical challenges, the methods and systems use a data structure that supports an unconventional data acquisition procedure for threat modeling, namely a threat model knowledge graph that captures and represents user contributed data semantically, expressing all known data entity attributes, and relationships between data instances. This knowledge graph facilitates automated first-order logical inference of all relationships not immediately expressed in the input data. Specifically, the methods and system may receive threat model contributions (e.g., recommendations featuring threat modeling content for inclusion in a crowdsourced threat model knowledge graph). The methods and systems may then derive metadata corresponding to the contribution that indicate contribution characteristics and semantics corresponding to the threat model contribution. The semantic metadata is then used by a threat modeling system to organize each of the received contributions into a threat model knowledge graph of a crowdsourced threat modeling system. However, the use of a threat model knowledge graph raises additional technical hurdles as a knowledge graph represents a collection of interlinked descriptions of threat model contributions, each with individual characteristics, that needs to be put into a useable context to provide integration, unification, analytics, and sharing. This is particularly problematic for knowledge graphs based on threat model contributions. For example, each threat model contribution may be designed for a specific system and/or architecture, data flow, threat, mitigation technique, issue to be resolved, etc. Accordingly, a crowdsourced threat modeling system based on a threat model knowledge graph may require a standardized ontology to integrate different threat model contributions. For example, the system may retrieve data structure corresponding to specific contributions and determine respective ontology for the contributions. The system may then map these ontologies to each other and/or an integrated ontology for the threat model knowledge graph.

For example, the system may use natural language processing ("NLP") and in particular semantic relationships and textual similarities on the ontologies (or the metadata representing the ontologies) corresponding to the contributions that indicate contribution characteristics to determine threat model contributions that correspond to each other and/or correspond to a particular location in the graph-structured data model or topology of the knowledge graph of the crowdsource threat modeling system. Furthermore, as the graph-structured data model or topology of the knowledge graph of the crowdsource database is based on the threat model contributions that are received, the graph-structured data model or topology of the knowledge graph of the crowdsource database may automatically update itself as additional threat model contributions are received.

However, after an integrated threat modeling system is developed, yet another technical hurdle may arise in how to properly use the threat modeling system. For example, the system may generate an initial mapping of the threat model knowledge graph across different categories of threat model contributions using characteristics of threat model contributions. The system may then categorize the different contributions into model structures, which may define a hierarchy of threat model contributions for the portion of the integrated threat modeling system. Using these model structures, the system may compare different portions of the integrated threat modeling system to non-integrated threat model contributions (which may correspond to a respective model structure). The system may then automatically validate contributions and provide statistics to aid users in reviewing contributions to the crowdsourced threat modeling system (e.g., for determining the ultimate selection, location, elimination, or rejection of different threat model contributions). Accordingly, the system may dynamically update the initial mapping of the knowledge graph as additional contributions to the crowdsourcing project are received as well as select new contributions that are required.

In some aspects, the systems and methods for generating recommendations based on threat model knowledge graphs comprising crowdsourced modeling contributions are described. For example, the system may receive a first threat model contribution from a first user, wherein the first threat model contribution has a first contribution characteristic. The system may determine, based on the first contribution characteristic, a first location in a threat model knowledge graph for the first threat model contribution. The system may receive a second threat model contribution from a second user, wherein the second threat model contribution has a second contribution characteristic. The system may determine, based on the second contribution characteristic, a second location in the threat model knowledge graph for the second threat model contribution. The system may add the first threat model contribution and the second threat model contribution to the threat model knowledge graph at the first location and the second location, respectively. In response to adding the first threat model contribution and the second threat model contribution to the threat model knowledge graph, the system may update a first threat modeling system. The system may generate for display, in a user interface, a recommendation based on the first threat modeling system, wherein the recommendation compares the first threat modeling system to a second threat modeling system.

In some aspects, the systems and methods for integrating crowdsourced threat model contributions into threat modeling systems are described. For example, the system may receive a user request to generate an integrated data structure for an integrated threat modeling system, wherein the integrated data structure defines an integrated ontology for a threat model knowledge graph of the integrated threat modeling system and a non-integrated threat model contribution. The system may retrieve a first data structure for the integrated threat modeling system, wherein the first data structure defines a first ontology for the threat model knowledge graph at a first node. The system may retrieve a second data structure for the non-integrated threat model contribution, wherein the second data structure defines a second ontology for the non-integrated threat model contribution. The system may generate a data structure node for the integrated data structure at the first node based on the first data structure and the second data structure, wherein the data structure node is shared by the first data structure and the second data structure in the integrated data structure. In response to generating the data structure node, the system may determine integration data, for the data structure node, that maps the first ontology to the second ontology. The system may generate for display, on the user interface, a recommendation based on the integrated data structure for the integrated threat modeling system.

In some aspects, the systems and methods for comparing crowdsourced threat modeling systems to non-integrated threat modeling systems to assess computer system vulnerabilities and cyber security threats are described herein. For example, the system may receive, via a user interface, a user request from a first user to access an integrated threat modeling system comprising a threat model knowledge graph, wherein the threat model knowledge graph defines an integrated hierarchy of threat model contributions for the integrated threat modeling system, and wherein the integrated hierarchy of threat model contributions comprises threat model contributions from a plurality of sources. The system may retrieve a first model structure for a portion of the integrated threat modeling system wherein the first model structure defines a first hierarchy of threat model contributions for the portion of the integrated threat modeling system. The system may retrieve a second model structure for a non-integrated threat modeling system wherein the second model structure defines a second hierarchy of threat model contributions for the non-integrated threat modeling system. The system may compare the first model structure and the second model structure. In response to comparing the first model structure and the second model structure, the system may generate for display, on the user interface, comparison data, wherein the comparison data describes, in a human-readable format, a relationship of the second model structure to the first model structure.

Various other aspects, features, and advantages of the invention will be apparent through the detailed description of the invention and the drawings attached hereto. It is also to be understood that both the foregoing general description and the following detailed description are examples and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification "a portion," refers to a part of, or the entirety of (i.e., the entire portion), a given item (e.g., data) unless the context clearly dictates otherwise.

BRIEF DESCRIPTION OF THE DRAWINGS

FIGS. 1A-F depict a user interface for interacting with a crowdsourced threat modeling system, in accordance with an embodiment.

FIG. 4 depicts an illustrative architecture for a data structure of the crowdsourced threat modeling system, in accordance with an embodiment.

FIG. 5 depicts an illustrative architecture for a model structure of the crowdsourced threat modeling system, in accordance with an embodiment.

DETAILED DESCRIPTION OF THE DRAWINGS

Figure 1A:
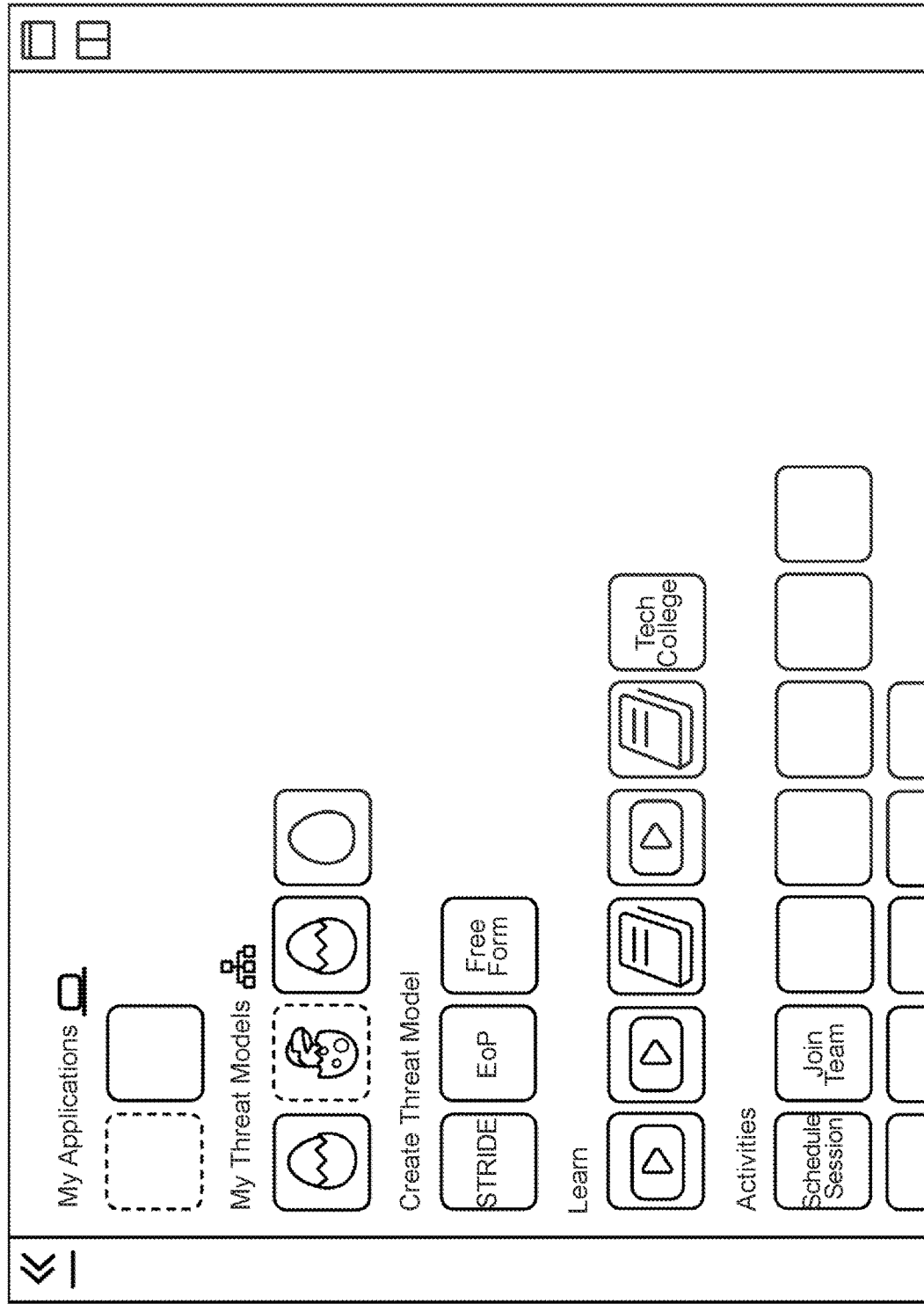

In the following description, for the purposes of explanation, numerous specific details are set forth in order to provide a thorough understanding of the embodiments of the invention. It will be appreciated, however, by those having skill in the art, that the embodiments of the invention may be practiced without these specific details, or with an equivalent arrangement. In other cases, well-known structures and devices are shown in block diagram form in order to avoid unnecessarily obscuring the embodiments of the invention.

Methods and system may receive threat model contributions (e.g., recommendations featuring threat modeling content for inclusion in a crowdsourced threat model knowledge graph). The methods and systems may then derive metadata corresponding to the contribution that indicate contribution characteristics and semantics corresponding to the threat model contribution. The semantic metadata is then used by a threat modeling system to organize each of the received contributions into a threat model knowledge graph of a crowdsourced threat modeling system. By doing so, the system overcomes the technical challenges that have traditionally inhibited creation and enhancement of threat models through crowd sourcing, namely providing transferrable knowledge for similar systems and services but there is no mechanism for a team building a new threat model to leverage previously created threat models for other similar systems; and aggregating disconnected cyber security data.

FIGS. 1A-F depict a user interface for interacting with a crowdsourced threat modeling system, in accordance with an embodiment. For example, the system and methods described herein may generate for display, on a local display device (e.g., user device 322 and 324 (FIG. 3) described below), a user interface for a crowdsource platform. For example, the system may display content that is published to a crowdsource database as well as provide a hierarchical organization of that content. Users may access, interact with, and/or edit content in the crowdsource database by interacting with the user interfaces shown in FIGS. 1A-F. For example, users may see pending requests for crowdsourced threat model contributions and/or pending versions of a threat modeling system as well as interact with and/or compare different threat model contributions. Users may also submit contributions as well as user selections of content for data structures (e.g., as described in relation to FIG. 4 below) and/or model structures (e.g., as described in relation to FIG. 5 below). Users may also view submissions of other contributors (e.g., threat model contributions made by other users to the same or different threat modeling system) as well as receive characteristics about the contributors (e.g., name, organization, level of technical diversity, technical background, work history, etc.).

As referred to herein, a "user interface" may comprise a human-computer interaction and communication in a device, and may include display screens, keyboards, a mouse, and the appearance of a desktop. For example, a user interface may comprise a way a user interacts with an application or a website. As described herein, the application and/or website may comprise a threat modeling system as described herein. The threat modeling system may comprise a plurality of threat model contributions. For example, the system may comprise an integrated threat modeling system comprising a threat model knowledge graph, wherein the threat model knowledge graph defines an integrated hierarchy of threat model contributions for the integrated threat modeling system, and wherein the integrated hierarchy of threat model contributions comprises threat model contributions from a plurality of sources. For example, the plurality of sources may comprise different authors, organizations, and/or other entities.

The threat modeling system may arrange and/or organize the threat model contributions into an integrated hierarchy. For example, the system may organize the various threat model contributions into a system in which threat model contributions are organized one above the other according to function. The hierarchy may comprise a plurality of threat model contributions arranged in series and/or in parallel in which the inputs and outputs are intertwined such that information from one or more threat model contributions may be received from, and/or used by, one or more other threat model contributions.

Each threat model contribution may comprise content such as software applications, instructions, and/or other information used by a threat modeling system. Each threat model may also include an ontology and/or other characteristics about a contribution that describes the threat model contributions and/or portions of the threat model contributions. In some embodiments, the ontology may include information populated in a data structure and/or model structure as described herein as well as the input and/or outputs that are processed by a threat modeling system and/or one or more threat model contributions. For example, the ontology may represent a fully semantic data model used to enable data entered into the system to be meaningfully applied across different threat model application domain contexts.

In some embodiments, the system may use the content such as contribution characteristics (e.g., ontologies and/or values associated with a category of an ontology) to organize threat model contributions into the hierarchy. The hierarchy may comprise a threat model knowledge graph as described herein. As referred to herein, the "threat model knowledge graph" may comprise a complex structured and/or unstructured set of information used by a computer system to enable a threat modeling system. The threat model knowledge graph may use a hierarchical or relational database structure to link different content (e.g., threat model contributions) within the threat modeling system. For example, a hierarchical database structure may be a structure in which data is organized into a tree-like structure. For example, the data may be stored as records which are connected to one another through links. A record may be a collection of fields, with each field containing only one value (e.g., content). The type of a record may define which fields the record contains. In some embodiments, the tree structure may comprise a node-link structure in which a parent node links to child nodes, nested sets (e.g., in relational databases), radial trees, and/or other organizational systems.

Each threat model contribution may comprise a component of the threat model. For example, "components" of a threat model may include portions of the threat model (e.g., corresponding to one or more nodes of the threat model knowledge graph) that provide modeling for a specific domain application, address specific threats, relate to particular mitigation techniques, provide a specific function and/or are otherwise distinct from other portions of the threat model.

As referred to herein, "content" should be understood to mean an electronically consumable user asset, such as a threat model contribution, data about a threat model contribution (e.g., contribution characteristics, contributor characteristics, etc.), and/or other types of content such as video clips, audio, content information, pictures, rotating images, documents, playlists, websites, articles, books, electronic books, blogs, advertisements, chat sessions, social media, applications, games, and/or any other media or multimedia and/or combination of the same. As referred to herein, the term "multimedia" should be understood to mean content that utilizes at least two different content forms described above, for example, text, audio, images, video, or interactivity content forms.

FIGS. 1A-F depict a user interface for interacting with a crowdsourced threat modeling system. It should be noted that in some embodiments the user interfaces described in FIGS. 1A-F may depict the same user interface or different user interfaces and/or different instances of the same user interface. For example, the user interfaces shown in FIGS. 1A-F may comprise a web portal for accessing/using one or more threat modeling systems and/or threat model contributions as well as learning resources to manage teams and applications.

User interface 100 may also include content in a plurality of sections. For example, user interface 100 may include categories and sub-categories as well as project and/or topic groupings each of which may be divided into sections. As referred to herein, a "section" may comprise any of the more or less distinct parts into which something the content may be divided or from which the content is made up. For example, a section may be distinguished from another section by one or more section characteristics. In user interface 100, the system may identify a section of the plurality of sections as having a section characteristic.

User interface 100 is shown divided into a plurality of sections corresponding to different functions, each of which is represented by a different icon. For example, user interface 100 includes sections related to selecting threat modeling systems, selecting threat modeling contributions, creating threat modelling systems and contributions, comparing threat modeling systems and/or contributions, etc. Each section is distinguished using a section characteristic. A section characteristic may comprise any characteristic that distinguishes one section from another. For example, a section characteristic may be media-related information (e.g., ordering, heading information, titles, descriptions, ratings information, source code data (e.g., HTML, source code headers, etc.), genre or category information, subject matter information, author information, logo data, or other identifiers for the content provider), media format, file type, object type, objects appearing in the content (e.g., product placements, advertisements, keywords, context), or any other suitable information used to distinguish one section from another. In some embodiments, the section characteristic may also be human-readable text. The section characteristic may be determined to be indicative of the section being of interest to the user based on a comparison of the section characteristic and user profile data for the user.

Figure 1B:
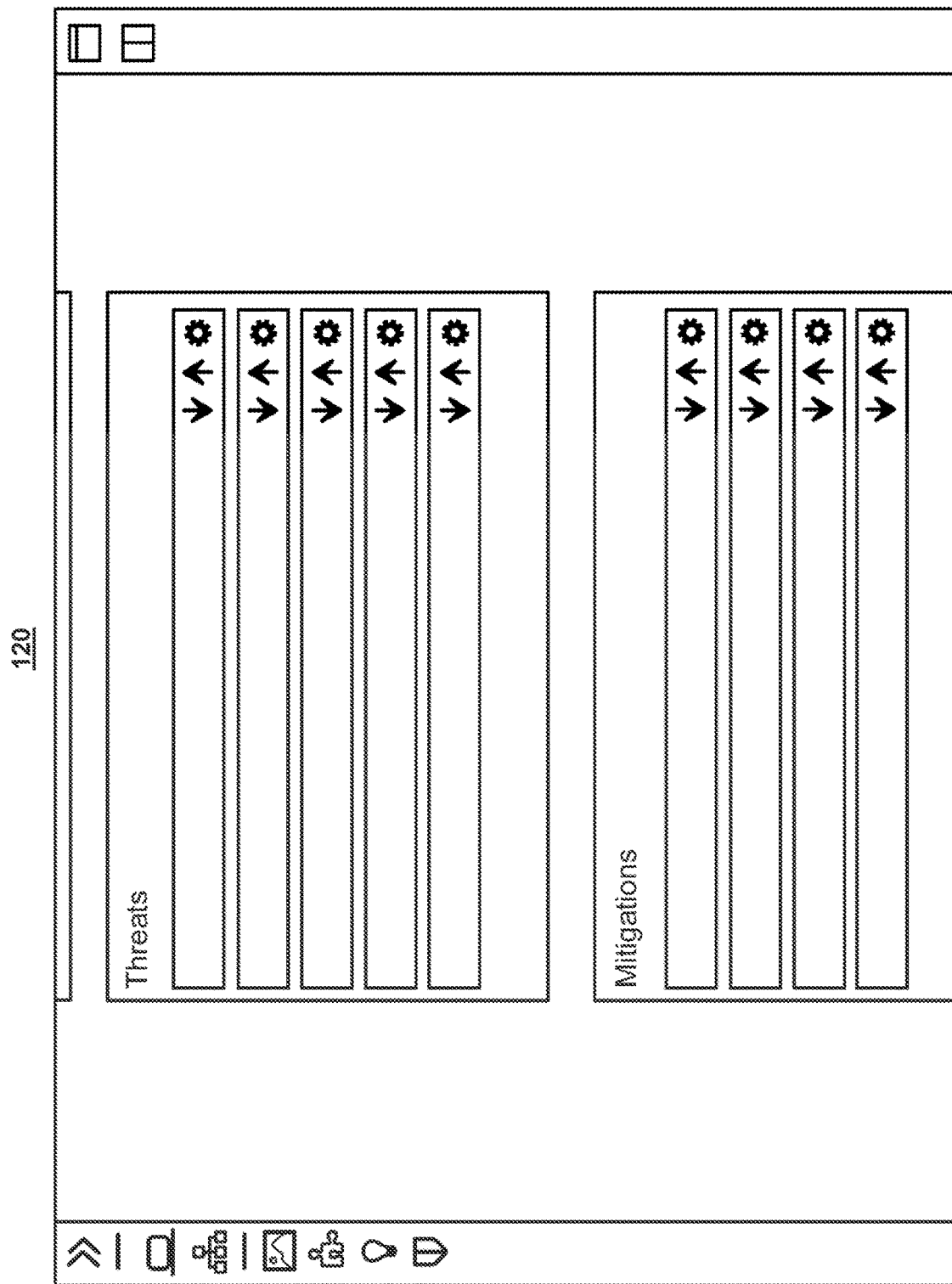

As shown in FIG. 1B, user interface 120 may allow users to enter information about a threat modeling system and/or threat modeling contribution. Threat model contributions may be received from one or more users and content found therein may be used to update a crowdsource database. For example, a threat model contribution may include any communication that contributes to a selection of a hierarchy for a crowdsource database and/or contributes content to the crowdsource database. A threat model contribution may include a contribution characteristic. A contribution characteristic may include any information that describes the contribution such as a topic or category of the contribution, including information used to populate an ontology for the contribution and/or otherwise describe a data structure and/or model structure for a threat model contribution. For example, the contribution characteristic may indicate how a contribution is indexed and/or archived in a threat model knowledge graph and/or threat modeling system. For example, each threat model contribution may correspond to content (e.g., content to be included in a crowdsource database project) and/or a contribution characteristic. For example, the contribution characteristic may provide an ontology that provides a fully semantic data model used to enable data entered into the system to be meaningfully applied across different threat model application domain contexts (e.g., provide connections between different nodes of the threat model knowledge graph.

Figure 1C:
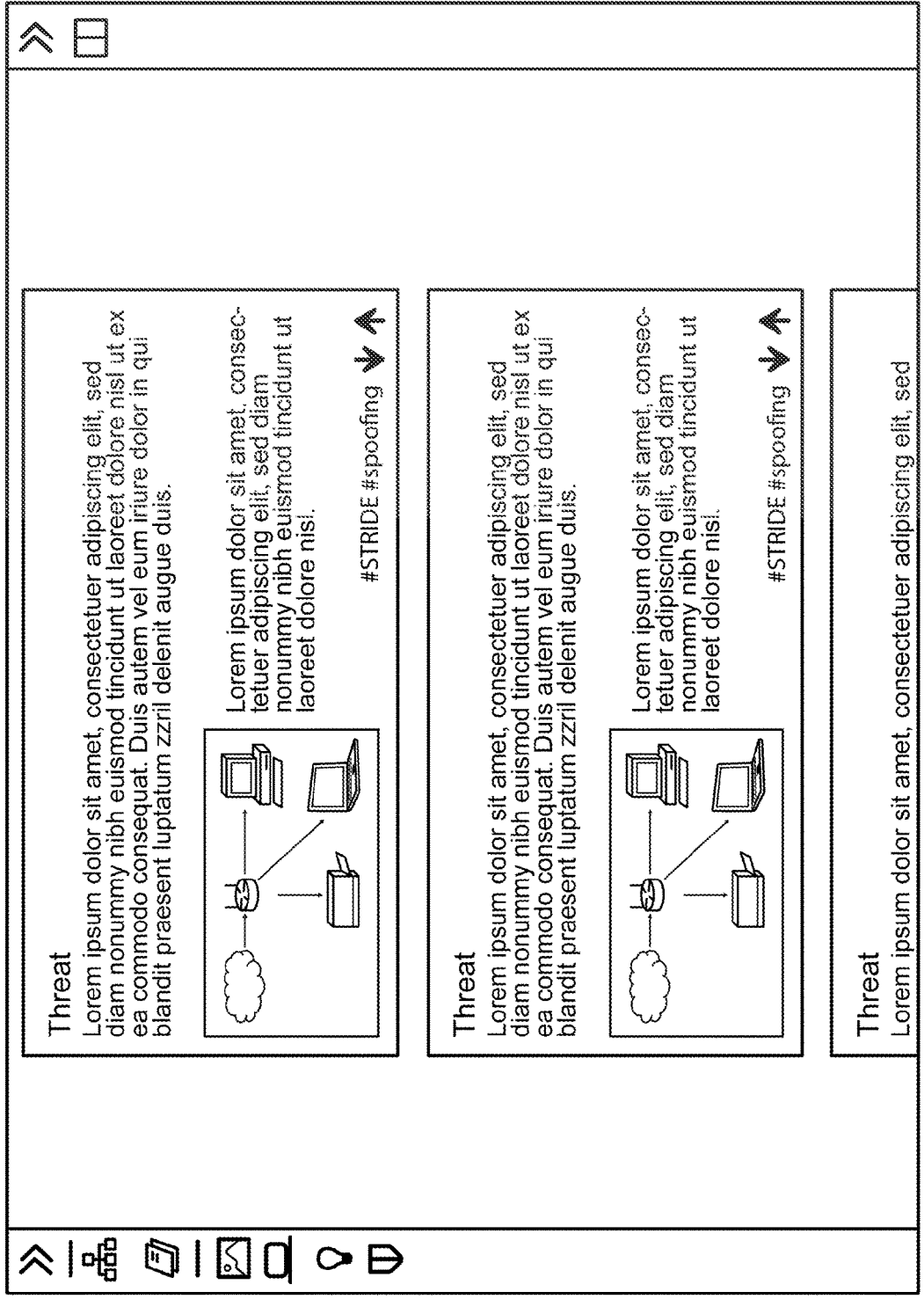

As shown in FIG. 1C, user interface 140 may allow users to review information about a threat modeling system and/or threat modeling contribution. For example, as shown in FIG. 1C, the system may present available feed of threats to allow users to determine the proper amount of coverage across components and types of threats. For example, threat model contributions and the threats that are mitigated by the ever-growing threat model knowledge graph as well as threat model contributions submitted by one or more contributors. Moreover, through user interface 140, users may be able to access information according to one or more altitudes. For example, the threat modeling system may be composed, and reviewable at, different altitudes in an organization in order to facilitate risk management at different levels of management structure.

Figure 1D:
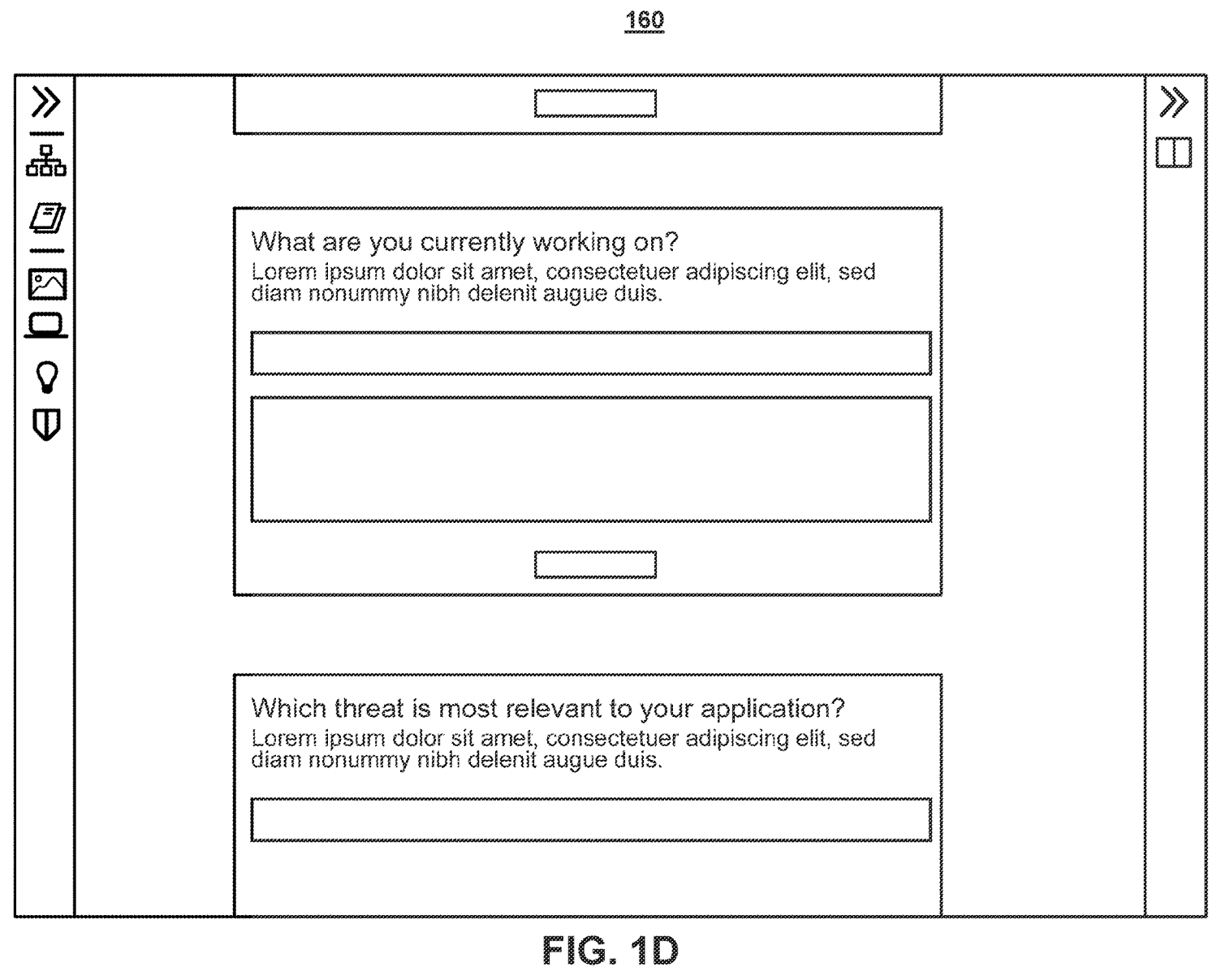
Figure 1E:
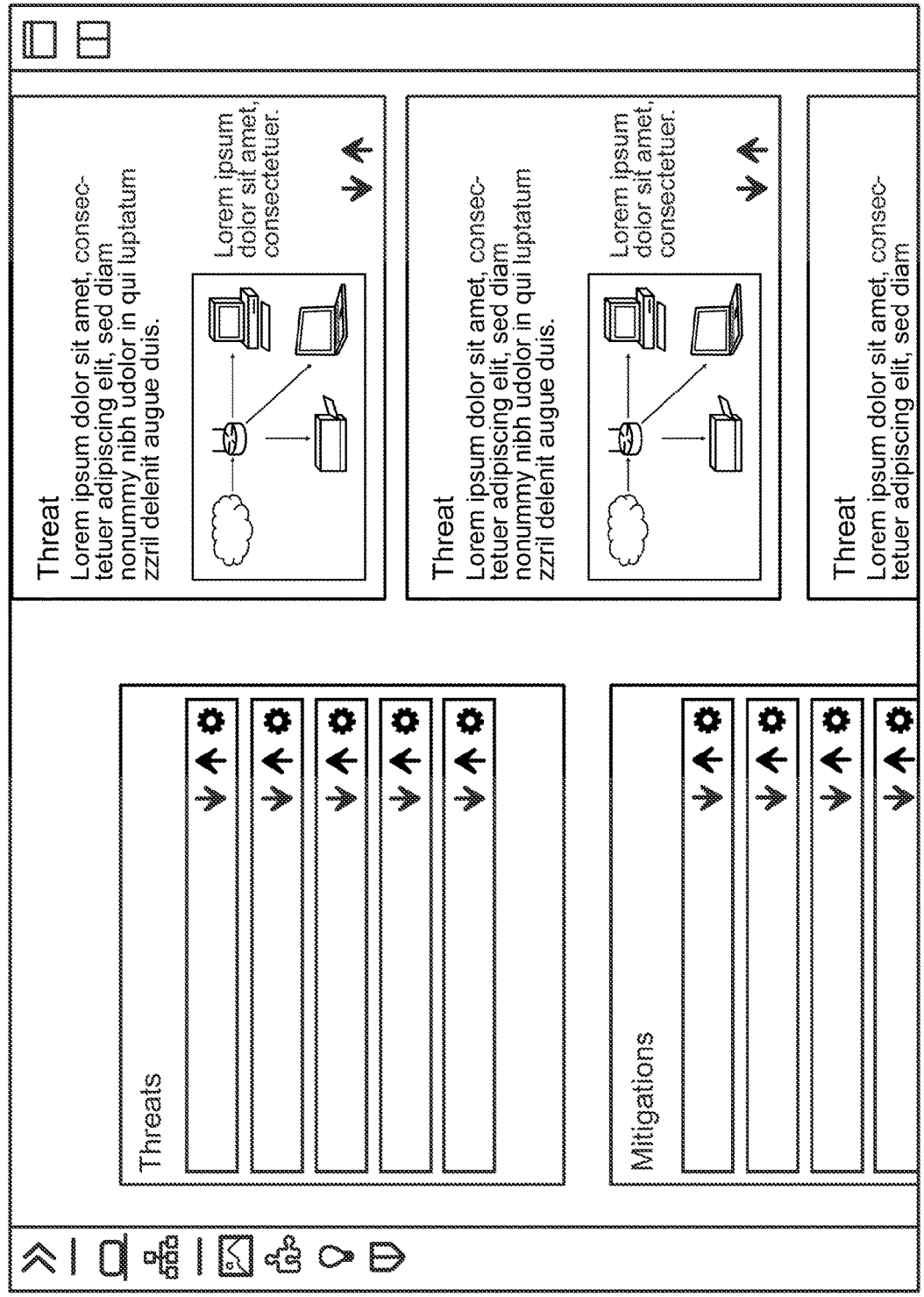

For example, as shown in FIG. 1D, user interface 160 may allow users or contributors to review the threat modeling system through selectable portions (e.g., corresponding to a given model structure). For example, user interface 160 may provide a series of user prompts that provide human readable queries that allow users to review, edit, and/or create threat modeling systems and/or threat model contributions. Furthermore, as shown in FIG. 1E, user interface 180 may allow feedback loops between required threat model contributions and received threat model contributions. In some embodiments, user interface 180 may provide a split screen that allows users to compare one or more threat modeling systems and/or threat model contributions as well as characteristics for the one or more threat modeling systems and/or threat model contributions.

In some embodiments, the system may also allow for users to vote on candidate threats on the feed, and if threats are deemed to be relevant (and/or threat model contributions are validated), the users (e.g., having a predetermined level of authorization establishing edit rights) may add a threat mode contribution to a threat modeling system. In some embodiments, users may also vote on prioritizing and/or ranking threat model contributions as well as editing integration data for different threat model contributions. For example, the system may receive a number of user confirmations for adding the first threat model contribution to the threat model knowledge graph. The system may then compare the number of user confirmations to a threshold number. The system may then validate the first threat model contribution based on the number of user confirmations corresponding to the threshold number.

In some embodiments, the system may provide role-based access control coupled with traditional relational data model used for storing the threat model data. By doing so, the system may inhibit the re-use of data outside of each threat model's data silo, and/or the system provides the maximal use of the data that is available within the system for automation and composability of threat models. Similarly, the system may use role-based access control to enable crowdsourcing and amplification of cyber security and threat modeling knowledge entered into the system by users (e.g., ensuring only users with the proper credentials may provide modifications to the systems).

For example, the system may provide guided preparation, session flow and retrospectives which save the contributor time and creates a consistent threat modeling experience between users. The system may allow users to continue to create common understanding through dialogue and diagrams using a whiteboard, then upload their architecture and design to the system (e.g., via user interface 160). The system may automatically suggest candidate threats to consider based on the key components provided in the session, helping even contributors new to threat modeling contribute quickly. The system may suggest threats as the team works through a guided brainstorm using a STRIDE framework. The system may provide contextual information to help the users strengthen and improve their overall security knowledge.

Figure 1F:
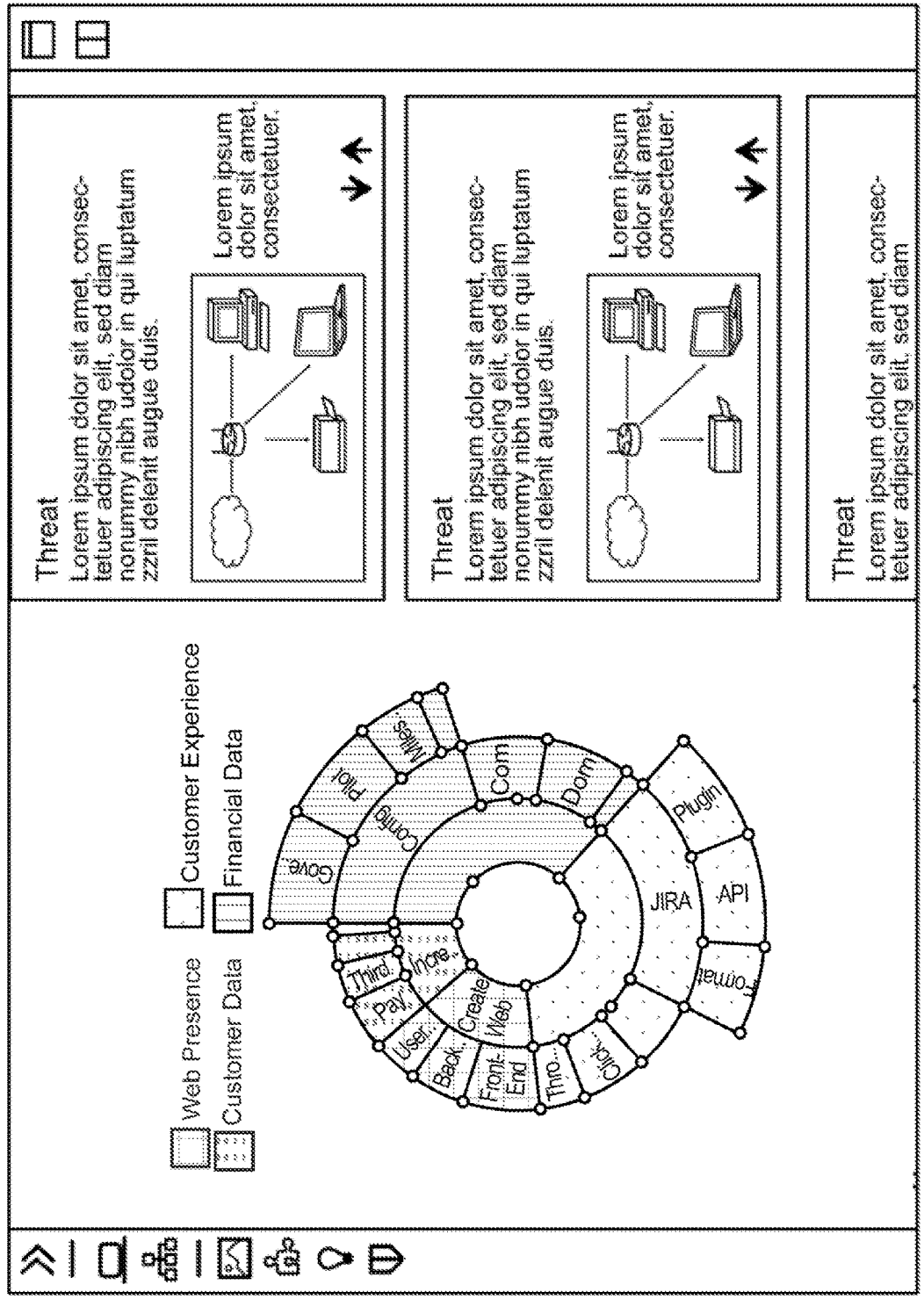

As shown in FIG. 1F, user interface 190 may be used by the system to provide one or more recommendations (e.g., based on one or more types of recommendation data). For example, the system may provide numerous types of recommendations as described herein. In some embodiments, user interface 190 (or the recommendation data therein) may be presented as a status page. The status page may include summary information about a threat modeling system, threat model contribution, comparison data, integration data, and recommendation data as well as issues, stakeholders, responsible contributors, etc. The status page may also include queries that may be performed.

Additionally, while the system may assist in detecting threats, the system may also provide recommendations in the form of actionable outcomes. Threats and mitigating controls are easily prioritized in the system and actions can be pushed to a project management tool (e.g., software used bug tracking, issue tracking, and project management), either as new stories or as acceptance criteria on existing stories or epics. The system may also provide a reporting view that provides a clear and/or comprehensive overview of the threat modeling system and/or individual threat model contribution progress and outcomes.

The system may also modify the information presented based on the user accessing the system. For example, in response to a user accessing the system, the system may retrieve a user profile for the user. For example, user interface 190 may also include a Gantt chart indicating progress for one or more threat model contributions and sub-threat model contributions, filters, and/or provide view changes. Depending on a business unit corresponding to a user, the system may provide information related to the business unit (e.g., threats that may affect the business unit).

Additionally or alternatively, the system may compare threat model contributions and provide aggregated and filtered views. The system may also receive applications that are included as components in threat modeling systems and/or threat modeling components. When a threat model depends on another application, the threat model for the dependent system incorporates "exported" threats and mitigations from the threat model for the service dependency. For example, when a web service application depends upon an Identity and Access Management ("IAM") service for authentication, the threat modeling system and/or threat model contribution for the web service may import the exported threats from the IAM service threat model such as the threat that authentication tokens could be stolen.

The recommendation data may be presented in any format and/or representation of data that can be naturally read by humans. In some embodiments, the recommendation data may appear as a graphical representation of data (e.g., as shown in FIG. 1F). For example, the recommendation data may comprise a sunburst graph indicating business units affected by a threat model contribution and/or threat. In such cases, generating the sunburst graph may comprise determining a plurality of model structure nodes for the threat model knowledge graph and graphically representing a relationship of the plurality of model structure nodes.

In some embodiments, the recommendation may provide automated threat and mitigation discovery. For example, the system may provide automated suggestions to the user of relevant threats to the application being modeled based on the representations of the application that the user makes available to the system. Threat suggestions are driven from representations of the application such as architecture diagrams, dataflow diagrams, user journey diagrams, software design documents and wikis, project management systems such as JIRA, and/or software code repositories. In some embodiments, the automated threat suggestions may be provided by a knowledge graph of known threats. Each threat in the knowledge graph may be connected to technology and architectural concepts that are subject to those threats, micro-architectures (e.g., combinations of software architecture constructs that may exhibit the threat), and/or mitigation actions (e.g. controls and coding practices) that can prevent the threat.

In some embodiments, the system may leverage two sources of data to further enhance the relevance of the automated threat suggestions through the use of a recommendation engine to rank the relevance of the returned results and improve the suggestion quality. For example, the system may determine previous decisions made by users of the system on whether to include and exclude a suggested threat for a given set of concepts. For example, if, for a given set of concepts, multiple users have chosen to include a suggested threat in their threat model, the relevance of that threat to those concepts is considered high. Alternatively, where a threat has often been rejected for inclusion in a threat model, the threat relevance is reduced.

Additionally or alternatively, the system may determine a set of all threat models currently known to the system. Threat suggestions are further refined by the system examining the similarity of the application being modeled and other applications with threat models in the system (e.g., as described herein). For example, where the system is able to identify other similar applications, the set of threats for those similar applications are used to enhance the suggested threats for the current threat model.

Figure 2:
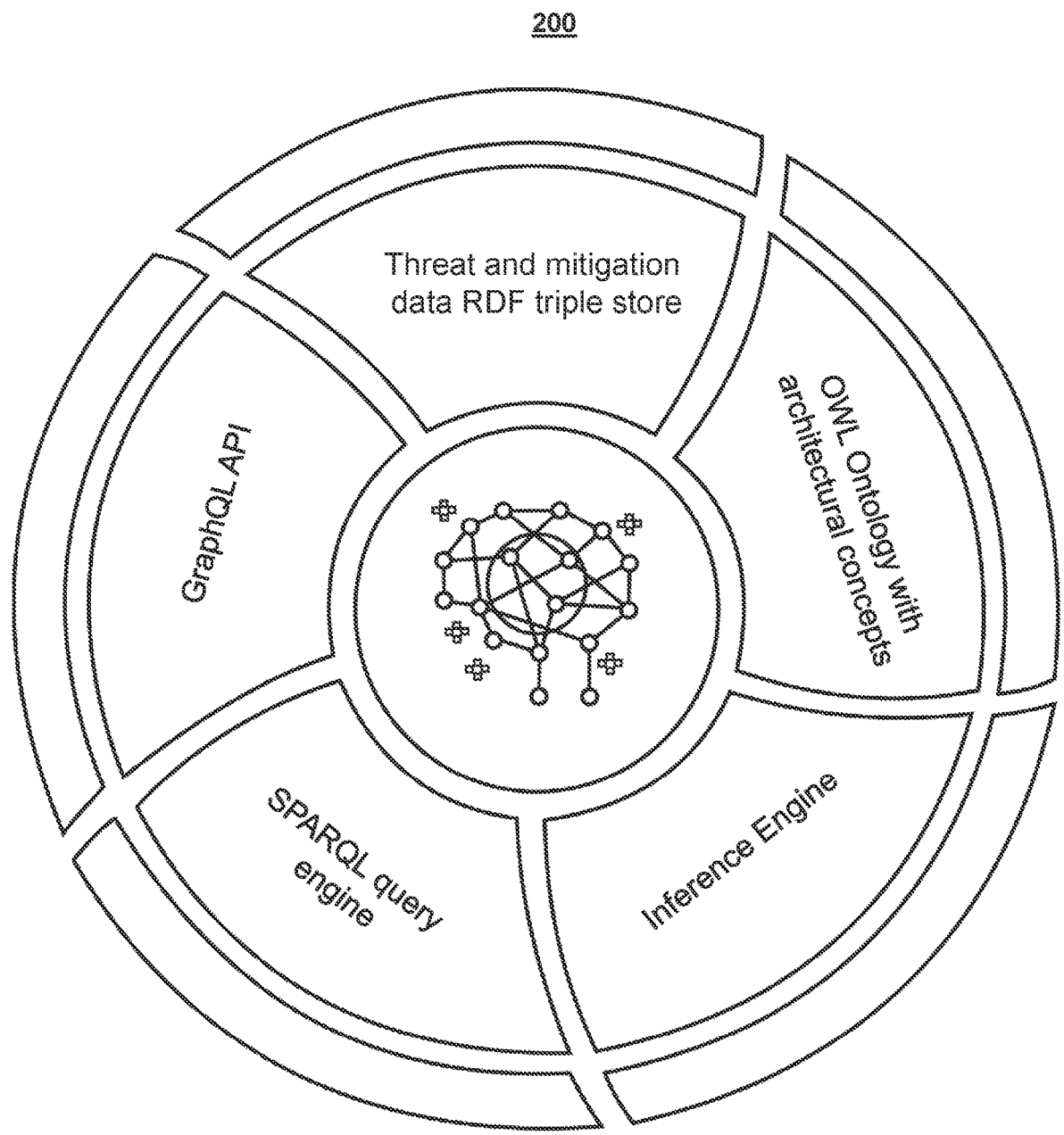
FIG. 2 depicts illustrative diagram of a knowledge graph for use in a crowdsourced threat modeling system, in accordance with an embodiment.

FIG. 2 depicts an illustrative diagram of a knowledge graph for use in a crowdsourced threat modeling system, in accordance with an embodiment. For example, FIG. 2 may depict a threat model knowledge graph that is used to implement a threat modeling system. For example, the threat model knowledge graph may comprise a knowledge base of threats enriched with semantic annotations to facilitate association of threat with architectural components and data flows. These semantic annotations (e.g., contribution characteristics) may be represented in ontologies for a particular threat model contribution and/or data structure corresponding to a threat model contribution and/or a given node of the threat model knowledge graph. The threat model knowledge graph and associated API (e.g., API 350 (FIG. 3)) allows for the threat modeling system to incorporate threat modelling intelligence and present users with the most relevant threats for a given set of components and data flows. The system may also use the threat model knowledge graph to link threats with mitigation strategies and controls (e.g., actionable controls for responding to a threat) for a given threat, as well as other resources such as Behavior Driven Design ("BDD") test templates. The threat model knowledge graph may aid the threat modeling system in its automation of threat modelling by removing the need to manually work through large collections of known threats, such as the Mitre Common Weakness Enumeration ("CWE") library, to identify relevant ones. The threat model knowledge graph (and the threat modeling system that incorporates the threat model knowledge graph) allows application users who may not be subject matter experts in cyber security to have access to relevant threat knowledge, and relevant information about how to mitigate and test for those threats.

The threat model knowledge graph (and the threat modeling system that incorporates the threat model knowledge graph) may retrieve information from databases of known threats, vulnerabilities, controls exist (such as the CWE database, the Mitre ATT & CK database, and OWASP resources such as the Application Security Validation Standard, and the Web Application Security Testing section of the Testing Framework). Furthermore, the threat model knowledge graph (and the threat modeling system that incorporates the threat model knowledge graph) may identify which of those threats apply to components in a software architecture, which to date been entirely manual and time-consuming as the various databases of known threats share no common ontology, many of the resources not being unstructured (OWASP content), and to the lack of intelligent search facilities that span those databases and data sources.

The threat model knowledge graph (and the threat modeling system that incorporates the threat model knowledge graph) links and integrates data relevant to threat modeling into a single knowledge base, and enriches them with semantic annotations relevant to architecture and data-flow concepts in order to allow automated and intelligent identification of threats most relevant to a given software application. Through the provided API, applications can leverage the threat model knowledge graph (and the threat modeling system that incorporates the threat model knowledge graph) to automate the process of identifying threats relevant to a given software architecture, providing threat modelling intelligence to the application. Continuous integration of newly identified threats and mitigations means the threat model knowledge graph (and the threat modeling system that incorporates the threat model knowledge graph) facilitates the sharing of new threat modelling expertise across products, users and organizations. The threat model knowledge graph (and the threat modeling system that incorporates the threat model knowledge graph) establishes and leverages a reusable ontology of software architecture, data flow, threat and mitigation concepts that is an industry-wide and open-source collaboration of threat modelling intelligence. By employing linked data and semantic annotations, the threat model knowledge graph (and the threat modeling system that incorporates the threat model knowledge graph) provides a knowledge graph of concepts related to threats, controls, and architectural concepts which lays the foundation for future machine learning based approaches to threat modeling.

It should be noted that as described herein, the use of artificial intelligence (AI) such as NLP and machine learning may be used interchangeably and/or embodiments described using NLP may also use machine learning. For example, AI may be used an as umbrella term for both machine learning and NLP. AI may comprise any learning by a machine (e.g., learning that simulates that human intelligence) and/or the mimicking of cognitive capabilities, like learning from examples and solving problems. In some embodiments, NLP may be used to understand and translate human language (e.g., via translation, keyword extraction, topic classification, etc.). Machine learning may be used to apply algorithms that teach machines how to automatically learn and improve from experience without being explicitly programmed. In some embodiments, the system may combine NLP and machine learning model (e.g., collectively referred to as machine learning model) to perform one or more of the tasks described herein.

For example, in some embodiments, the system may use a threat model knowledge graph (e.g., featuring NLP) for topic analysis (e.g., organizing and understanding large collections of text data). The system may assign "tags" or categories according to each individual contribution characteristic (e.g., semantic annotations), which may correspond to the data structures described herein. For example, NLP may be used to interpret human language to allow for patterns to be detected by the system and to determine semantic structures within texts using NLP topic modelling, which is an unsupervised machine learning technique in which the model may infer patterns and cluster similar expressions without needing to define topic tags or train data beforehand. It should also be noted that in some embodiments, the system may use both supervised training and/or a combination of supervised and unsupervised training.

Figure 3:
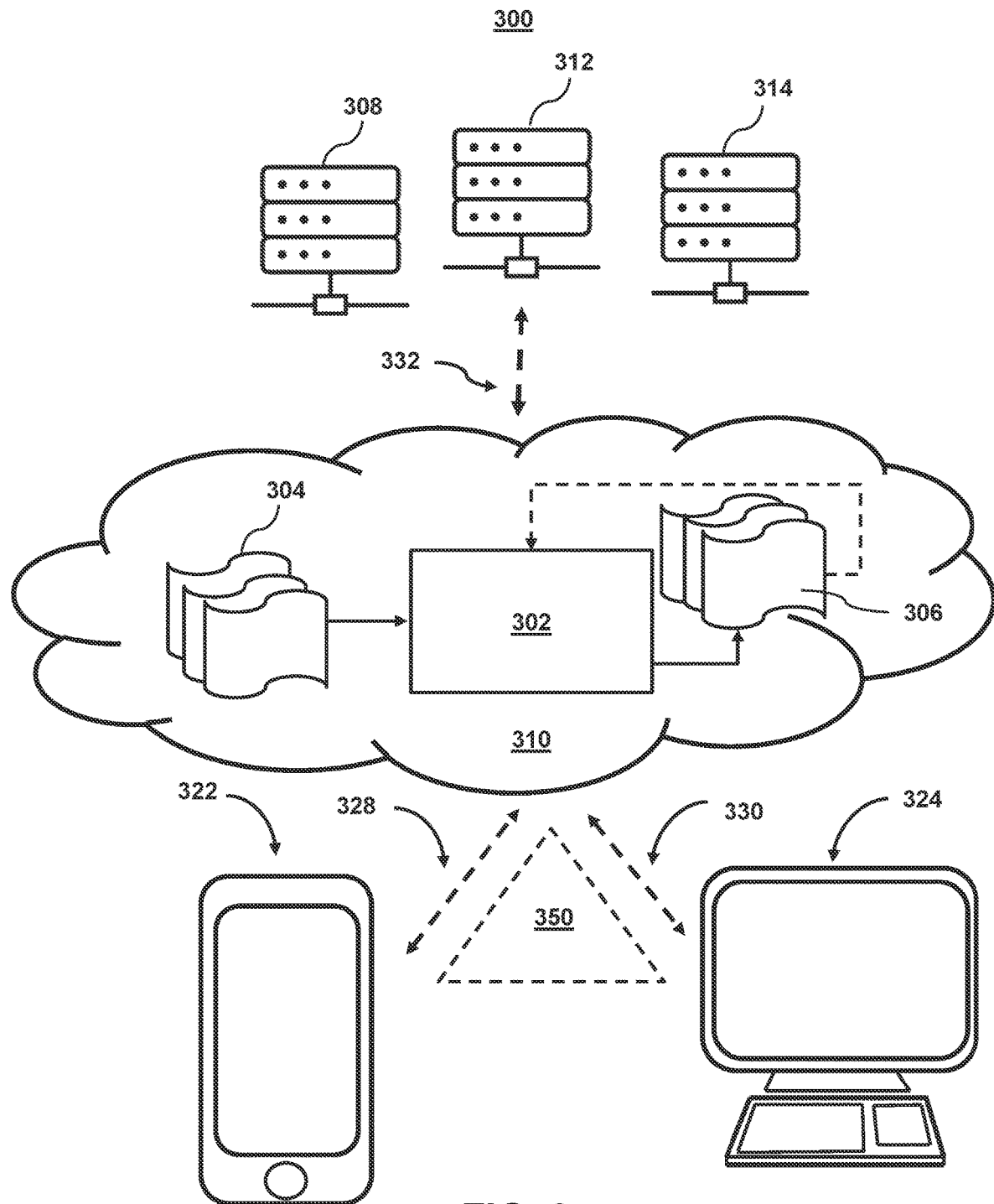
FIG. 3 depicts an illustrative system for a crowdsourced threat modeling system, in accordance with an embodiment.

FIG. 3 depicts an illustrative system for a crowdsourced threat modeling system, in accordance with an embodiment. For example, system 300 may represent the components used for generating recommendations based on threat model knowledge graphs comprising crowdsourced modeling contributions. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a hand-held computer, other computer equipment (e.g., a server), including "smart," wireless, wearable, and/or mobile devices. FIG. 3 also includes cloud components 310. Cloud components 310 may alternatively be any computing device as described above and may include any type of mobile terminal, fixed terminal, or other device. For example, cloud components 310 may be implemented as a cloud computing system and may feature one or more component devices. It should also be noted that system 300 is not limited to three devices. Users, may, for instance, utilize one or more devices to interact with one another, one or more servers, or other components of system 300. It should be noted, that while one or more operations are described herein as being performed by particular components of system 300, those operations may, in some embodiments, be performed by other components of system 300. As an example, while one or more operations are described herein as being performed by components of mobile device 322, those operations, may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., notifications).

Additionally, as mobile device 322 and user terminal 324 are shown as touchscreen smartphones, these displays also act as user input interfaces. It should be noted that in some embodiments, the devices may have neither user input interface nor displays and may instead receive and display content using another device (e.g., a dedicated display device such as a computer screen and/or a dedicated input device such as a remote control, mouse, voice input, etc.). Additionally, the devices in system 300 may run an application (or another suitable program). The application may cause the processors and/or control circuitry to perform operations related to generating alternative content.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may include first data source 308, second data source 312 and crowdsource database 314. First data source 308 may correspond to a data source of a first entity (e.g., a first crowd source user). First data source 308 may have a first native data structure and/or first contribution characteristic. The first native data structure and/or first contribution characteristic may correspond to a software architecture, data flow, threat and/or mitigation technique corresponding to first contribution. Second data source 312 may correspond to a data source of a second entity (e.g., a second crowd source user). Second data source 312 may have a second native data structure and/or second contribution characteristic. The second native data structure and/or second contribution characteristic may correspond to a software architecture, data flow, threat and/or mitigation technique corresponding to second contribution. Crowdsource database 314 may correspond to a crowdsource database housing the threat modeling system, which may be distinct from the first and second entity. Crowdsource database 314 may have a native hierarchical data structure (e.g., a threat model knowledge graph) and/or native contribution characteristic. Furthermore, the system may use machine learning to generate a hierarchical data structure for crowdsource database 314 based on first data source 308 and second data source 312 even though first data source 308 and second data source 312 may feature different contribution characteristics. In some embodiments, first data source 308, second data source 312, and crowdsource database 314 may correspond to data source 202, data source 206, and crowd database 204, respectively.

Cloud components 310 may also include model 302, which may be a threat model knowledge graph (e.g., as described in FIG. 2) and/or AI model that generate a threat model knowledge graph. Model 302 may take inputs 304 and provide outputs 306. The inputs may include multiple datasets such as a training dataset and a test dataset. Each of the plurality of datasets (e.g., inputs 304) may include data subsets related to hierarchical data structures for the crowdsource database, contribution characteristics, native data and contribution characteristics. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with a known data structure. The system may then train the first machine learning model to classify inputted data structures to known data structures of hierarchical data structures (e.g., to determine similarities between different semantic annotations and/or other contribution characteristics.

In another embodiment, model 302 may update its configurations (e.g., weights, biases, or other parameters) based on the assessment of its prediction (e.g., outputs 306) and reference feedback information (e.g., user indication of accuracy, reference labels, or other information). In another embodiment, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302 and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, back propagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302 (e.g., a given model structure corresponds to another model structure, a given data structure corresponds to another data structure, a given ontology corresponds to another ontology, a given contribution characteristic corresponds to another contribution characteristic).

System 300 also includes API layer 350. In some embodiments, API layer 350 may be implemented on user device 322 or user terminal 324. Alternatively or additionally, API layer 350 may reside on one or more of cloud components 310. API layer 350 (which may be A REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages including Ruby, Java, PUP, and JavaScript. SOAP Web services have traditionally been adopted in the enterprise for publishing internal services as well as for exchanging information with partners in B2B transactions.

API layer 350 may use various architectural arrangements. For example, system 300 may be partially based on API layer 350, such that there is strong adoption of SOAP and RESTful Web-services, using resources like Service Repository and Developer Portal but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer where microservices reside. In this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API Platforms and their modules. API layer 350 may use a developer portal. API layer 350 may use strong security constraints applying WAF and DDoS protection, and API layer 350 may use RESTful APIs as standard for external integration.

FIG. 4 depicts an illustrative architecture for a data structure of the crowdsourced threat modeling system, in accordance with an embodiment. For example, FIG. 4 includes illustrative architecture 400, node data structure 450, and threat model contribution data structure 470. Architecture 400 indicates contribution characteristics and a data structure that include those contribution characteristics for a node of a threat model knowledge graph of a threat modeling system. The contribution characteristics and a data structure of architecture 400 may provide the basis on an ontology for which a model structure corresponding to the node.

For example, the system may feature a fully (or partially) semantic data model to enable user entered data to be meaningfully applied across different threat model application domain contexts. To overcome the technical challenges inherent to such a technical undertaking, the methods and systems use a data structure that supports an unconventional data acquisition procedure for threat modeling, namely a threat model knowledge graph that captures and represents in a data structure user contributed data semantically, expressing all known data entity attributes, and relationships between data instances. The data structure may facilitate automated first-order logical inference of all relationships not immediately expressed in the input data. For example, the data structure may derive metadata corresponding to the contribution that indicate contribution characteristics and semantics corresponding to the threat model contribution. The semantic metadata may then be used by the system to organize each of the received contributions into the data structure representing the threat model knowledge graph.

For example, the knowledge graph may be underpinned by semantic ontologies for threats and mitigations as well as technology and software architecture concepts. In some embodiments, the system may use OWL. OWL-S is an ontology built on top of Web Ontology Language ("OWL") by the DARPA DAIL program. For example, the system may use supplied representations to identify relevant technology concepts, software architecture concepts, and micro-architectures. The system may identify these through a combination of: machine learning approaches such as NLP for representations such as software design documents, XMIL tags in architecture and dataflow diagrams, and/or the user manually identifying key technologies and concepts in the representations.

The system may use this information to determine an integrated ontology for a hierarchical data structure (e.g., a threat model knowledge graph) for the crowdsource threat modeling system. For example, the system may map all categories from architecture 400 for a first data structure (e.g., node data structure 450) to a second data structure (e.g., threat model contribution data structure 470). Furthermore, for each category of contribution characteristics, there may be one or more equivalent contribution characteristics for the threat model knowledge graph for the crowdsource threat modeling system. For example, the system may use a many to many mappings system when mapping of a contribution characteristic of a threat model contribution to the threat model knowledge graph for the crowdsource threat modeling system as shown in architecture 450. For example, the system may map many different records in contribution characteristics (e.g., corresponding to different values for a given contribution characteristics from different threat model contributions) to one or more different records the threat model knowledge graph for the crowdsource threat modeling system.

In some embodiments, the system may identify and use micro-architectures to drive a search of the knowledge graph for threats relevant to those concepts and micro-architectures. Leveraging the OWL ontologies described above, the system may use search results that are enhanced through inferred relationships. The system returns the search results comprising threats and connected mitigation actions for those threats to the user for consideration for inclusion in the threat model for the system.

Using architecture 400, the common semantic annotations found in contribution characteristics may be matched to identify threat model contributions that correspond to one another. The system may actively query the mapping between different contribution characteristics in the data structure by using NLP to identifying similar contribution characteristics. In some embodiments, the machine learning model may be trained to synchronize threat model contributions based on contribution characteristics corresponding to inputted threat model contributions. For example, the machine learning model may be trained to synchronize keywords, semantic annotations, tags, and/or contribution characteristics in the data structures. For example, the system may retrieve "Android" and "iOS" from node data structure 450 and threat model contribution data structure 470, respectively. The system may compare these keywords using a mapping corresponding to an integrated ontology to determine if the different software architectures correspond. For example, the system may generate an initial mapping of contribution characteristics across different data structures using a threat model knowledge graph (e.g., by semantically linking similar attributes across sources). The machine learning model may determine keyword similarities and/or semantic closeness between keywords in the first and second contribution characteristics, respectively, or the first and second data structures. For example, the system may then retrieve a first contribution characteristic keyword for the first data structure and retrieving a second contribution characteristic keyword for the second data structure. For example, the system may identify a keyword of a topic (or category) under which the first data structure indexes and/or organized in the threat model knowledge graph (e.g., based on an integrated ontology). Additionally, the system may identify a keyword of a topic (or category) under which the second data structure indexes and/or organizes in the threat model knowledge graph (e.g., based on an integrated ontology). The system may then determine a first similarity between the first contribution characteristic keyword and the second contribution characteristic keyword. For example, the system may determine a vector space distance between two textual entities (keywords, hashes, documents, etc.). The system may then compare the first similarity to a threshold similarity. The system may then determine that the first contribution characteristic keyword and the second contribution characteristic keyword correspond based on the first similarity equaling or exceeding the threshold similarity (and not correspond otherwise). The system may then populate the threat model contribution and the node of the threat model system in response to determining that the first contribution characteristic keyword and the second contribution characteristic keyword correspond. It should be noted that the system may also compare a similarity of first and second ontologies according to the above.

In some embodiments, the system may also use additional factors such as a corresponding user selection of a taxonomy and/or mapping. For example, the system may use both the contribution characteristic for a data source as well as a user selection entered by a user to determine an initial mapping and/or a record in the native hierarchy for placing the threat model contribution. For example, the mapping of the contribution characteristics of node data structure 450 and threat model contribution data structure 470 may be defined by integration data.

As referred to herein, "integration data" that maps a first ontology to the second ontology. For example, the system may use integration data to define how first contribution characteristic keywords are mapped, the second contribution characteristic keywords and/or how first contribution characteristics are mapped to second contribution characteristics. That is, the integration data may be used to map semantic relationships between data, data entity attributes, and relationships between data instances. For example, in some embodiments, the first ontology may describe a first type of software architecture at the first node of the threat model knowledge graph and second ontology may describe a second type of software architecture of the non-integrated threat model contribution. In such cases, the integration data maps the first type of software architecture to the second type of software architecture. the first ontology describes a first type of data flow at the first node of the threat model knowledge graph, and wherein the second ontology describes a second type of data flow of the non-integrated threat model contribution, and wherein the integration data maps the first type of data flow to the second type of data flow.

In another example, the first ontology may describe a first type of threat addressed at the first node of the threat model knowledge graph and the second ontology may describe a second type of threat addressed by the non-integrated threat model contribution. In such cases, the integration data maps the first type of threat to the second type of threat. In another example, the first ontology may describe a first type of mitigation technique corresponding to the first node of the threat model knowledge graph and the second ontology may describe a second type of mitigation technique corresponding to the non-integrated threat model contribution. In such cases, the integration data maps the first type of mitigation technique to the second type of mitigation technique.

FIG. 5 depicts an illustrative architecture for a model structure of the crowdsourced threat modeling system, in accordance with an embodiment. For example, FIG. 5 includes illustrative architecture 500, model structure 550, and model structure 570. Architecture 500 indicates contribution characteristics and a model structure that include those contribution characteristics for a portion of the integrated threat modeling system. The contribution characteristics and a model structure of architecture 500 may provide the basis for generating comparison data. As referred to herein, "comparison data" may comprise any data used to compare one or more model structures to one or more other model structures. For example, comparison data may comprise data used to compare a model structure corresponding to a threat model contribution to a model structure corresponding to a portion of the integrated threat modeling system. The comparison data may be used to compare semantic relationships between data, data entity attributes, and relationships between data instances. In some embodiments, the system may use the comparison data to generate one or more recommendations a described herein.

The system may use this information to compare threat model contributions for the crowdsource threat modeling system. For example, the system may compare one or more categories from architecture 500 for a first model structure (e.g., model structure 550) to a second model structure (e.g., model structure 570). For example, the system may compare many different records in contribution characteristics (e.g., corresponding to different values for a given contribution characteristics from different threat model contributions) to one or more different records for different threat model contributions.

Using architecture 500, the common semantic annotations found in contribution characteristics may be compared for different threat model contributions. The system may actively query the contribution characteristics between different threat model contributions using NLP to identifying similar contribution characteristics. In some embodiments, the machine learning model may be trained to identify contribution characteristics in the threat model contributions. For example, the machine learning model may be trained to identify keywords, semantic annotations, tags, and/or contribution characteristics in the model structures. For example, the system may retrieve a "Last Update" category from model structure 550 and model structure 570, respectively.

For example, the system may use various contribution characteristics to compare model structures. Illustrative, and non-limiting examples are shown in architecture 500. The system may use one or more quantitative and/or qualitative metrics to compare the model structures. For example, the system may use the coverage of the recency of a threat model to compare model structures. For example, Threat models require continuous updating due to the evolution of (1) the implementation of new application features; (2) changes in the business, regulatory and legal context of the application; (3) changes in the technology context of the application (e.g. changes in potential blast radius due to new dependent services); (4) changes and advances in the Cyber context as new threats emerge, and as adversaries develop new tools and techniques. The system may establish how frequently the threat model is updated and maintained in order to provide a maintenance health metric for the threat model.

Additionally or alternatively, the system may use the coverage of the threat models over all identified components and technologies identified in the application to compare model structures. For example, the system may provide different reports and recommendations based on an altitude needed. For example, the system may identify a "healthy" threat model contribution as having considered threats associated with all identified components of the application and may have mitigations recorded as being in an implemented status for those threats. This metric may reduce in value as new components and technologies are added to the application without having recorded consideration of threats and mitigations for those components.

Additionally or alternatively, the system may use review statuses to compare model structures. For example, threat model creation requires collaboration between software engineers, product owners, business owners and cyber security professionals. The system enables peer review capabilities that facilitate broad collaboration. The review mechanism may also be leveraged by cyber and risk professionals across the business to review the quality and suitability of the threat models and submit actions needed for improvement. This enables the system to generate metrics to be made available that measure the recency and sufficiency of reviews (as determined by organizational policy), and the status of actions that have been identified during reviews.

Additionally or alternatively, the system may use contributor characteristics such as reputational composition to compare model structures. For example, high quality threat modeling may require collaboration and input from a range of key stakeholders including software engineers, product owners, business owners and cyber security professionals, risk professionals etc. Accordingly, the system may determine one or more characteristics of the contributors that contributed the threat model contribution to compare model structures. For example, where a threat model is created be a small, closed group of people with little review there is a risk that the threat model suffers from "group think" and a lack of challenge. A threat model has a broad range of contributors with a diversity of expertise brings greater confidence that all threat perspectives have been adequately considered. By establishing the identity and reputation of each contributor to a threat model metrics are created that provide indices for diversity of contribution and expertise leveraged in creating the threat model.

Figure 6:
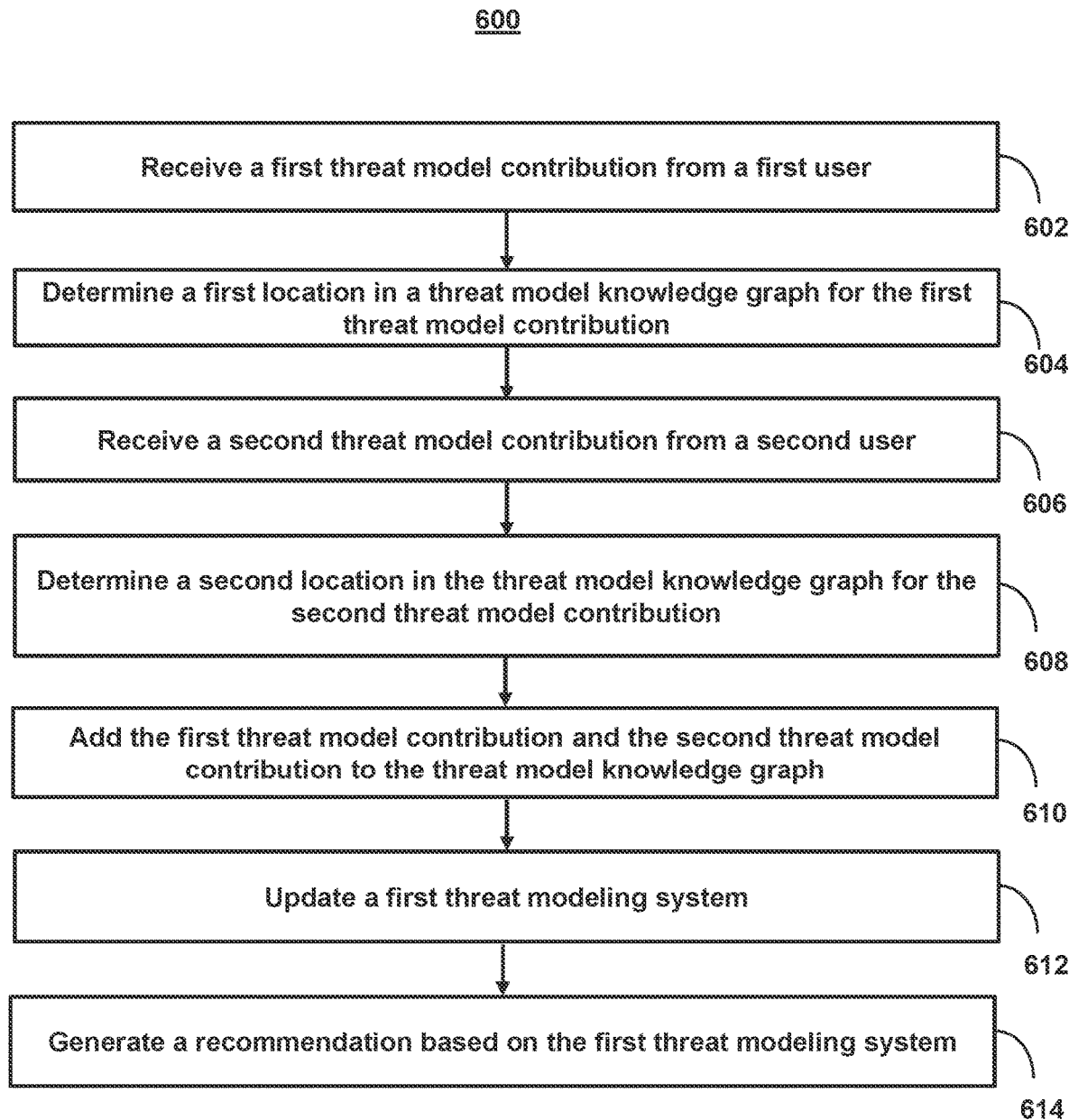
FIG. 6 depicts a process for generating recommendations based on threat model knowledge graphs comprising crowdsourced modeling contributions, in accordance with an embodiment.

FIG. 6 depicts a process for generating recommendations based on threat model knowledge graphs comprising crowdsourced modeling contributions, in accordance with an embodiment. For example, FIG. 6 shows process 600, which may be implemented by one or more devices. The system may implement process 600 in order to generate one or more of the user interfaces (e.g., as described in FIGS. 1A-F).

At step 602, process 600 receives (e.g., using control circuitry of one or more components of system 300 (FIG. 3)) a first threat model contribution from a first user. For example, the system may receive a first threat model contribution from a first user, wherein the first threat model contribution has a first contribution characteristic. For example, the first contribution characteristic may indicate a first software architecture upon which the first threat model contribution is based, and the second contribution characteristic may indicate a second software architecture upon which the second threat model contribution is based. In another example, the first contribution characteristic may indicate a first mitigation technique upon which the first threat model contribution is based, and the second contribution characteristic may indicate a second mitigation technique upon which the second threat model contribution is based. In yet another example, the first contribution characteristic may indicate a first data flow upon which the first threat model contribution is based, and the second contribution characteristic may indicate a second data flow upon which the second threat model contribution is based. For example, a first threat model contribution may comprise first content for publishing in the first threat modeling system, and the second threat model contribution comprises second content for publishing in the first threat modeling system.

At step 604, process 600 determines (e.g., using control circuitry of one or more components of system 300 (FIG. 3)) a first location in a threat model knowledge graph for the first threat model contribution. For example, the system may determine, based on the first contribution characteristic, a first location in a threat model knowledge graph for the first threat model contribution. In some embodiments, determining, based on the first contribution characteristic, the first location, may further comprise retrieving a first contribution characteristic keyword for the first contribution characteristic. The system may then retrieve a second contribution characteristic keyword for available locations in the threat model knowledge graph. The system may then determine a first similarity between the first contribution characteristic keyword and the second contribution characteristic keyword. The system may then compare the first similarity to a threshold similarity. The system may then determine that the first contribution characteristic keyword and the second contribution characteristic keyword correspond based on the first similarity equaling or exceeding the threshold similarity.

At step 606, process 600 receives (e.g., using control circuitry of one or more components of system 300 (FIG. 3)) a second threat model contribution from a second user. For example, the system may receive a second threat model contribution from a second user, wherein the second threat model contribution has a second contribution characteristic.

At step 608, process 600 determines (e.g., using control circuitry of one or more components of system 300 (FIG. 3)) a second location in the threat model knowledge graph for the second threat model contribution. For example, the system may determine, based on the second contribution characteristic, a second location in the threat model knowledge graph for the second threat model contribution. For example, based on contribution characteristics, the system may determine a location for contributions. In some embodiments, the system may determine a third location in the threat model knowledge graph that is unpopulated. The system may then retrieve a third contribution characteristic for the third location. The system may identify a third user corresponding to the third contribution characteristic. The system may then transmit a request to the third user for a third threat model contribution for adding to the threat model knowledge graph at the third location. For example, the system may compare semantic relationships between data characteristics, data entity attributes, and relationships between data instances in order to determine a location for updates to the threat modeling system.

In some embodiments, the system may use one or more AI models to determine locations. For example, the system may receive a third threat model contribution, wherein the third threat model contribution has a third contribution characteristic. The system may input the third threat model contribution into a machine learning model, wherein the machine learning model is trained to selection locations for adding threat model contributions to the threat model knowledge graph. The system may receive an output of the machine learning model indicating a third location for adding the third threat model contribution to the threat model knowledge graph.

At step 610, process 600 adds (e.g., using control circuitry of one or more components of system 300 (FIG. 3)) the first threat model contribution and the second threat model contribution to the threat model knowledge graph. For example, the system may add the first threat model contribution and the second threat model contribution to the threat model knowledge graph at the first location and the second location, respectively.

At step 612, process 600 updates (e.g., using control circuitry of one or more components of system 300 (FIG. 3)) a first threat modeling system. For example, the system may in response to adding the first threat model contribution and the second threat model contribution to the threat model knowledge graph, update a first threat modeling system based on the threat model knowledge graph. For example, in some embodiments, updating the first threat modeling system may comprise receiving a first user characteristic for the first user. The system may then compare the first user characteristic to user characteristics required for updating the first threat modeling system. The system may then validate the first threat model contribution at the first location based on the first user characteristic corresponding to user characteristics required for updating the first threat modeling system. For example, the system may map semantic relationships between data characteristics, data entity attributes, and relationships between data instances in order to update the threat modeling system.

Alternatively or additionally, updating the first threat modeling system may comprise generate for display, in the user interface, a request to add the first threat model contribution to the threat model knowledge graph. The system may then receive a number of user confirmations for adding the first threat model contribution to the threat model knowledge graph. The system may then compare the number of user confirmations to a threshold number. The system may then validate the first threat model contribution based on the number of user confirmations corresponding to the threshold number.

At step 614, process 600 generates (e.g., using control circuitry of one or more components of system 300 (FIG. 3)) a recommendation based on the first threat modeling system. For example, the system may generate for display, in a user interface, a recommendation based on the first threat modeling system, wherein the recommendation compares the first threat modeling system to a second threat modeling system.

It is contemplated that the steps or descriptions of FIG. 6 may be used with any other embodiment of this disclosure. In addition, the steps and descriptions described in relation to FIG. 6 may be done in alternative orders, or in parallel to further the purposes of this disclosure. For example, each of these steps may be performed in any order, in parallel, or simultaneously to reduce lag, or increase the speed of the system or method. Furthermore, it should be noted that any of the devices or equipment discussed in relation to FIGS. 1-5 could be used to perform one of more of the steps in FIG. 6.

Figure 7:
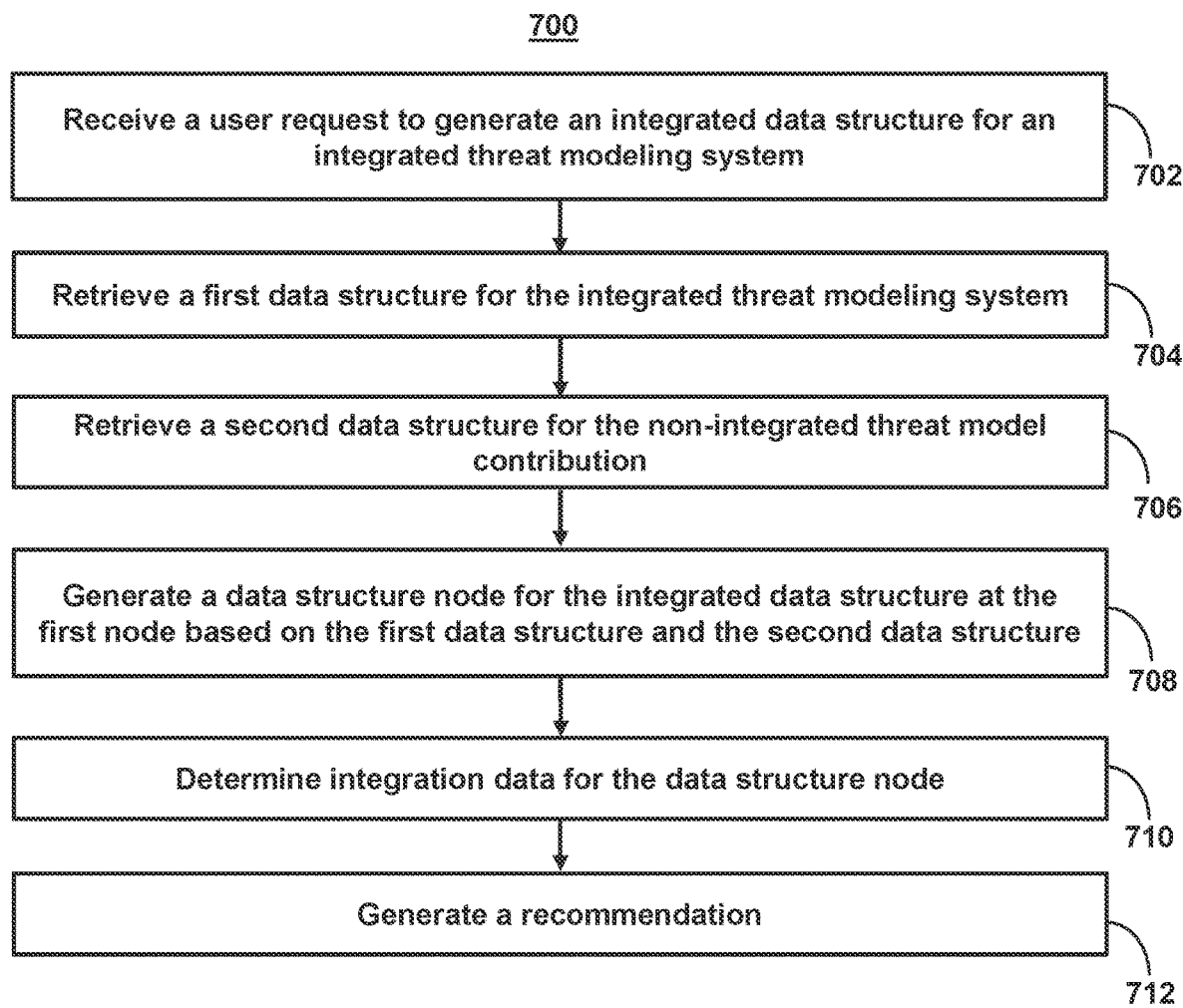
FIG. 7 depicts a process for integrating crowdsourced threat model contributions into threat modeling systems, in accordance with an embodiment.

FIG. 7 depicts a process for integrating crowd sourced threat model contributions into threat modeling systems, in accordance with an embodiment. For example, FIG. 7 shows process 700, which may be implemented by one or more devices. The system may implement process 700 in order to generate one or more of the user interfaces (e.g., as described in FIGS. 1A-F).

At step 702, process 700 receives (e.g., using control circuitry of one or more components of system 300 (FIG. 3)) a user request to generate an integrated data structure for an integrated threat modeling system. For example, the system may receive, via a user interface, a user request to generate an integrated data structure for an integrated threat modeling system, wherein the integrated data structure defines an integrated ontology for a threat model knowledge graph of the integrated threat modeling system and a non-integrated threat model contribution.

In some embodiments, in response to receiving the user request to generate the integrated data structure, the system may determine that the integrated data structure comprises the first data structure and the second data structure. In response to determining that the integrated data structure comprises the first data structure and the second data structure, the system may access a first remote issue link to a first server housing the first data structure and a second remote issue link to a second server housing the first data structure.

At step 704, process 700 receives (e.g., using control circuitry of one or more components of system 300 (FIG. 3)) a first data structure for the integrated threat modeling system. For example, the system may retrieve, using control circuitry, a first data structure for the integrated threat modeling system, wherein the first data structure defines a first ontology for the threat model knowledge graph at a first node.

In some embodiments, the system may compare contribution characteristics to select a node at which to integrate a contribution. For example, the system may retrieve first content from the first ontology. The system may retrieve second content from the second ontology. The system may determine a semantic closeness between the first content and the second content. The system may compare the semantic closeness to a threshold semantic closeness. The system may determine that first content and the second content correspond based on the semantic closeness equaling or exceeding the threshold semantic closeness. The system may determine to integrate the integrated threat modeling system and the non-integrated threat model contribution at the first node based on the semantic closeness equaling or exceeding the threshold semantic closeness.

Additionally or alternatively, the system may retrieve first content from the first ontology. The system may determine a keyword in the first content. The system may compare the keyword to a list of keywords corresponding to the second ontology. The system may determine to integrate the integrated threat modeling system and the non-integrated threat model contribution at the first node based on comparing the keyword to the list of keywords corresponding to the second ontology.

At step 706, process 700 retrieves (e.g., using control circuitry of one or more components of system 300 (FIG. 3)) a second data structure for the non-integrated threat model contribution. For example, the system may retrieve, using the control circuitry, a second data structure for the non-integrated threat model contribution, wherein the second data structure defines a second ontology for the non-integrated threat model contribution.

For example, the first ontology may describe a first type of software architecture at the first node of the threat model knowledge graph, and the second ontology may describe a second type of software architecture of the non-integrated threat model contribution. The integration data may therefore map the first type of software architecture to the second type of software architecture.

Additionally or alternatively, the first ontology may describe a first type of data flow at the first node of the threat model knowledge graph, and the second ontology may describe a second type of data flow of the non-integrated threat model contribution. The integration data may therefore map the first type of data flow to the second type of data flow.

Additionally or alternatively, the first ontology may describe a first type of threat addressed at the first node of the threat model knowledge graph, and the second ontology may describe a second type of threat addressed by the non-integrated threat model contribution. The integration data may therefore map the first type of threat to the second type of threat.

Additionally or alternatively, the first ontology may describe a first type of mitigation technique corresponding to the first node of the threat model knowledge graph, and the second ontology may describe a second type of mitigation technique corresponding to the non-integrated threat model contribution. The integration data may therefore map the first type of mitigation technique to the second type of mitigation technique.

At step 708, process 700 generates (e.g., using control circuitry of one or more components of system 300 (FIG. 3)) a data structure node for the integrated data structure at the first node based on the first data structure and the second data structure. For example, the system may generate, using the control circuitry, a data structure node for the integrated data structure at the first node based on the first data structure and the second data structure, wherein the data structure node is shared by the first data structure and the second data structure in the integrated data structure.

At step 710, process 700 determines (e.g., using control circuitry of one or more components of system 300 (FIG. 3)) integration data for the data structure node. For example, the system may in response to generating the data structure node, determine integration data, for the data structure node, that maps the first ontology to the second ontology. For example, the system may map semantic relationships between data characteristics, data entity attributes, and relationships between data instances in order to update the threat modeling system. In some embodiments, determining the integration data may further comprises determining the first ontology, determining the second ontology, and determining a rule set for automatically mapping the first ontology to the second ontology. In some embodiments, the system may receive a user edit to the integration data and store the edited integration data.

At step 712, process 700 generates (e.g., using control circuitry of one or more components of system 300 (FIG. 3)) a recommendation. For example, the system may generate for display, on the user interface, a recommendation based on the integrated data structure for the integrated threat modeling system.

It is contemplated that the steps or descriptions of FIG. 7 may be used with any other embodiment of this disclosure. In addition, the steps and descriptions described in relation to FIG. 7 may be done in alternative orders, or in parallel to further the purposes of this disclosure. For example, each of these steps may be performed in any order, in parallel, or simultaneously to reduce lag, or increase the speed of the system or method. Furthermore, it should be noted that any of the devices or equipment discussed in relation to FIGS. 1-5 could be used to perform one of more of the steps in FIG. 7.

Figure 8:
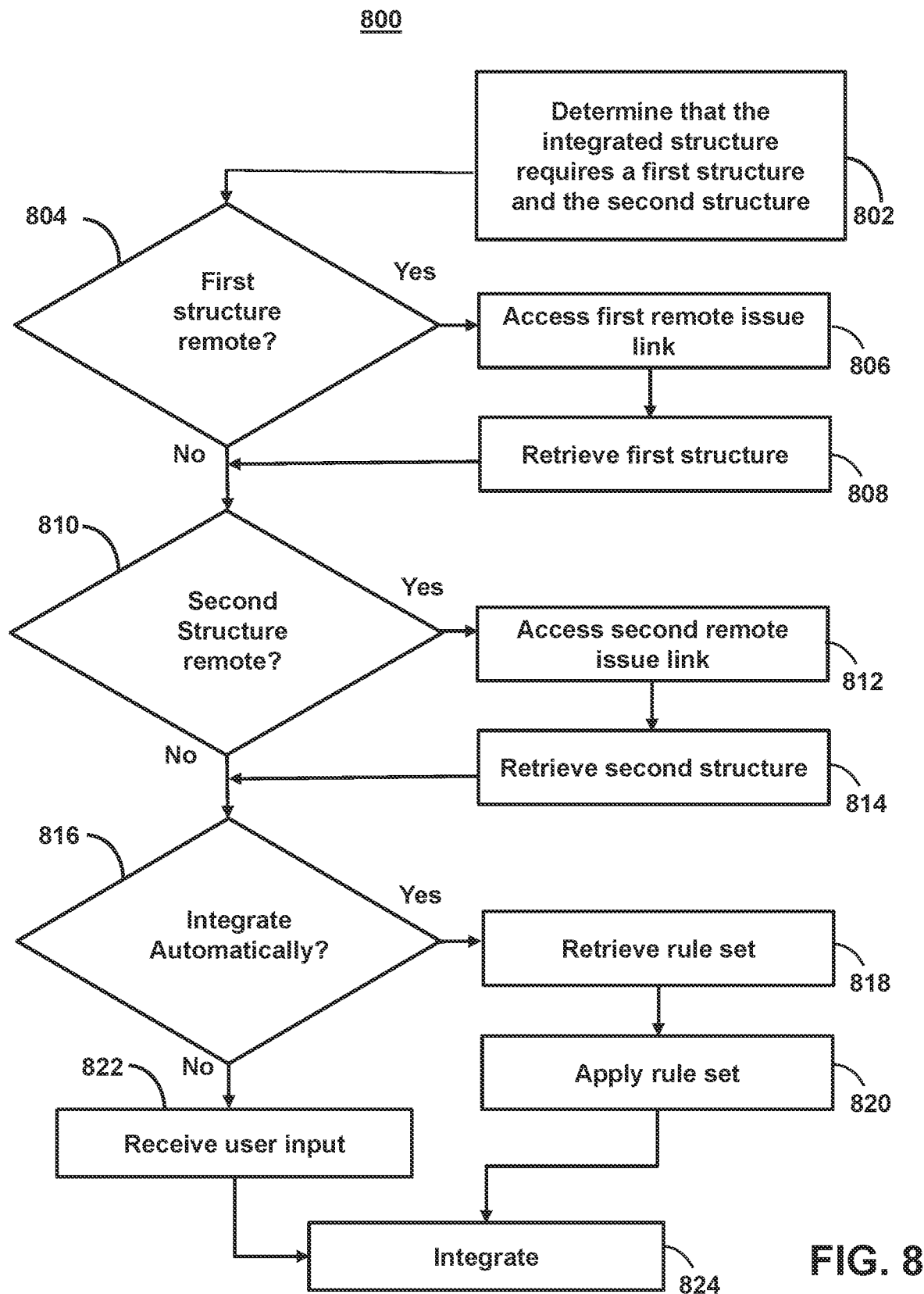
FIG. 8 depicts a process for generating an integrated data structure, in accordance with an embodiment.

FIG. 8 depicts a process for generating an integrated data structure, in accordance with an embodiment. For example, FIG. 8 shows process 800, which may be implemented by one or more devices. The system may implement process 800 in order to generate one or more of the user interfaces (e.g., as described in FIGS. 1A-F).

At step 802, process 800 determines (e.g., using control circuitry of one or more components of system 300 (FIG. 3)) that the integrated structure requires a first structure and the second structure. For example, in response to a user query (e.g., via user interface 100 (FIG. 1A)) to access a threat model knowledge graph for an integrated threat modeling system, the system may determine the one or more model structures (or one or more non-integrated threat modeling systems related to the model structures) are required. The system may input the user query into a database listing available model structures (and/or non-integrated threat modeling systems related to the model structures). The system may then filter the available model structures to determine one or more model structures required.

At step 804, process 800 determines (e.g., using control circuitry of one or more components of system 300 (FIG. 3)) whether or not the first model structure is located remotely. For example, if the threat modeling system is evaluating a remotely stored threat model contribution, the system may need to remotely access a remote server. If process 800 determines that the first model structure is located remotely, process 800 proceeds to step 806. If process 800 determines that the first model structure is not located remotely, process 800 proceeds to step 810.

At step 806, process 800 accesses (e.g., using control circuitry of one or more components of system 300 (FIG. 3)) a first remote issue link. For example, the first remote issue link may be an identifier that uniquely identifies a remote application and/or a remote object within a remote system housing the first model structure.

At step 808, process 800 retrieves (e.g., using control circuitry of one or more components of system 300 (FIG. 3)) the first model structure. For example, in response to receiving the user request to access the threat model knowledge graph, the system may determine that the threat model knowledge graph comprises the first model structure. In response to determining that the threat model knowledge graph comprises the first model structure, the system may access the first remote issue link to a first server housing the first model structure. Through the first remote issue link, the system may retrieve (e.g., download, stream, and/or otherwise access through one or more API or database functions) the first model structure.

At step 810, process 800 determines (e.g., using control circuitry of one or more components of system 300 (FIG. 3)) whether or not the second model structure is located remotely. For example, similar to the first model structure, the system may determine if the second model structure is available locally or remotely. If process 800 determines that the first model structure is located remotely, process 800 proceeds to step 812. If process 800 determines that the first model structure is not located remotely, process 800 proceeds to step 816.

At step 812, process 800 accesses (e.g., using control circuitry of one or more components of system 300 (FIG. 3)) a second remote issue link. For example, the second remote issue link may be an identifier that uniquely identifies a second remote application and/or a second remote object within a second remote system housing the second model structure. It should be noted that in some embodiments, the first and second model structures may be located in the same remote server. Furthermore, in some embodiments, the remote server may be a component of system 300 (FIG. 3)).

At step 814, process 800 retrieves (e.g., using control circuitry of one or more components of system 300 (FIG. 3)) the second model structure. For example, in response to receiving the user request to access the threat model knowledge graph, the system may determine that the threat model knowledge graph comprises the second model structure. In response to determining that the threat model knowledge graph comprises the second model structure, the system may access the second remote issue link to a second server housing the second model structure. Through the second remote issue link, the system may retrieve (e.g., download, stream, and/or otherwise access through one or more API or database functions) the second model structure.

At step 816, process 800 determines (e.g., using control circuitry of one or more components of system 300 (FIG. 3)) whether or not the first and second model structure are automatically integrated to generate the threat model knowledge graph. For example, in some embodiments, model structure automation may be used to reduce manual effort maintaining items. In such cases, the system may retrieve rules supported by the project management system, the threat modeling system, or model structure plugins. Exemplary rules may include "Add issues belonging to contribution" (e.g., which may pull in all child issues belonging to the contributions) and "Add sub-threat model contributions" (e.g., which may pull in all subthreat model contributions belonging to the contributions). If process 800 determines the first and second model structure are automatically integrated to generate the threat model knowledge graph, process 800 proceeds to step 818. If process 800 determines that the first and second model structures are not automatically integrated to generate the threat model knowledge graph, process 800 proceeds to step 822.

At step 818, process 800 retrieves (e.g., using control circuitry of one or more components of system 300 (FIG. 3)) a rule set. In some embodiments, the system may retrieve a standard rule set. Alternatively, the system may retrieve a custom rule set. For example, the system may select a rule set from a plurality of available rules sets based on a type of one or more model structures. For example, the system may determine a first system type for the portion of the integrated threat modeling system. The system may then determine a second system type for the non-integrated threat modeling system. The system may then determine a rule set for automatically generating the threat model knowledge graph based on the first system type and the second system type.

At step 820, process 800 applies (e.g., using control circuitry of one or more components of system 300 (FIG. 3)) a rule set. For example, the system may automatically generate the threat model knowledge graph based on the applying the rule set selected in step 818.

At step 822, process 800 receives (e.g., using control circuitry of one or more components of system 300 (FIG. 3)) user integration. For example, the system may receive user inputs (e.g., via user interface 100 (FIG. 1A)) selecting model structure nodes that are shared by the first and second model structure. Alternatively or additionally, the system may receive user inputs selecting a rule set for integrating one or more model structures and/or one or more portions of a model structure. For example, the system may receive user edits to integration data.

At step 824, process 800 generates (e.g., using control circuitry of one or more components of system 300 (FIG. 3)) a threat model knowledge graph. For example, the system may generate for display the threat model knowledge graph in a user interface (e.g., user interface 100 (FIG. 1A)). In some embodiments, generating the threat model knowledge graph may be an iterative process. For example, the system may generate a model structure graph for the threat model knowledge graph. The system may then determine model structure nodes (e.g., between the first and second model structure) based on the rule set selected in step 818 or based on the manual integration performed by a user in step 822.

It is contemplated that the steps or descriptions of FIG. 8 may be used with any other embodiment of this disclosure. In addition, the steps and descriptions described in relation to FIG. 8 may be done in alternative orders, or in parallel to further the purposes of this disclosure. For example, each of these steps may be performed in any order, in parallel, or simultaneously to reduce lag, or increase the speed of the system or method. Furthermore, it should be noted that any of the devices or equipment discussed in relation to FIGS. 1-5 could be used to perform one of more of the steps in FIG. 8.

Figure 9:
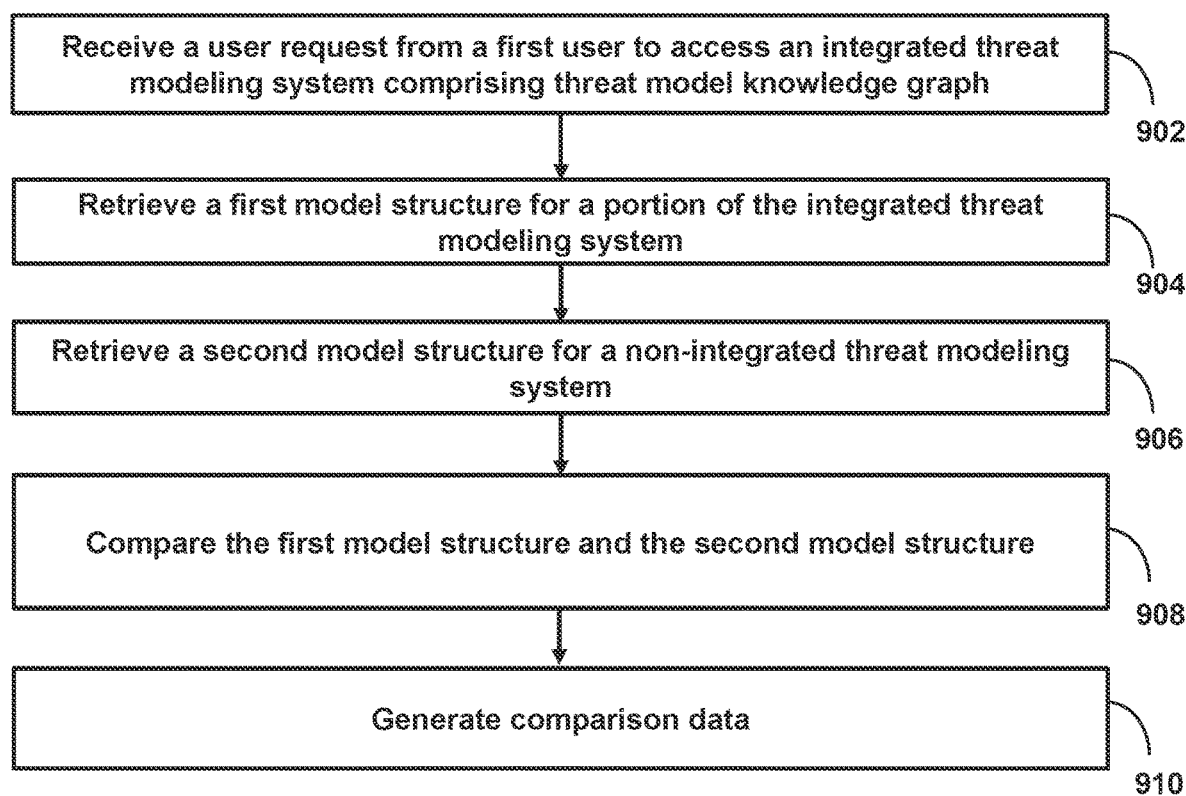
FIG. 9 depicts a process for comparing crowdsourced threat modeling systems to non-integrated threat modeling systems to assess computer system vulnerabilities and cyber security threats, in accordance with an embodiment.

FIG. 9 depicts a process for comparing crowd sourced threat modeling systems to non-integrated threat modeling systems to assess computer system vulnerabilities and cyber security threats, in accordance with an embodiment. For example, FIG. 9 shows process 900, which may be implemented by one or more devices. The system may implement process 900 in order to generate one or more of the user interfaces (e.g., as described in FIGS. 1A-F).

At step 902, process 900 retrieves (e.g., using control circuitry of one or more components of system 300 (FIG. 3)) a user request from a first user to access an integrated threat modeling system comprising threat model knowledge graph. For example, the system may receive, via a user interface, a user request from a first user to access an integrated threat modeling system comprising a threat model knowledge graph, wherein the threat model knowledge graph defines an integrated hierarchy of threat model contributions for the integrated threat modeling system, and wherein the integrated hierarchy of threat model contributions comprises threat model contributions from a plurality of sources. For example, each threat model contribution of the threat model contributions for the integrated threat modeling system may corresponds to an integrated data structure, and each integrated data structure defines an integrated ontology mapping a first ontology for a first threat model contribution to a second ontology for a second threat model contribution. In some embodiments, the first ontology may describe a first type of software architecture of the first threat model contribution, and the second ontology may describe a second type of software architecture of the second threat model contribution.

At step 904, process 900 retrieves (e.g., using control circuitry of one or more components of system 300 (FIG. 3)) a first model structure for a portion of the integrated threat modeling system. For example, the system may retrieve, using control circuitry, a first model structure for a portion of the integrated threat modeling system, wherein the first model structure defines a first hierarchy of threat model contributions for the portion of the integrated threat modeling system.

At step 906, process 900 retrieves (e.g., using control circuitry of one or more components of system 300 (FIG. 3)) a second model structure for a non-integrated threat modeling system. For example, the system may retrieve, using the control circuitry, a second model structure for a non-integrated threat modeling system, wherein the second model structure defines a second hierarchy of threat model contributions for the non-integrated threat modeling system.

At step 908, process 900 compares (e.g., using control circuitry of one or more components of system 300 (FIG. 3)) the first model structure and the second model structure. For example, the system may compare, using control circuitry, the first model structure and the second model structure. For example, the system may compare contribution characteristics corresponding the to the first and second model structure.

In some embodiments, comparing the first model structure and the second model structure, may further comprise determining a first author of a first threat model contribution of the first hierarchy of threat model contributions. The system may then determine a second author of a second threat model contribution of the second hierarchy of threat model contributions. The system may then compare a first characteristic of the first author to a second characteristic of the second author. The system may then determine the comparison data based on comparing the first characteristic of the first author to the second characteristic of the second author. For example, the first characteristic may comprise a level of technical diversity of the first author, and the second characteristic may comprise a level of technical diversity of the second author.

Additionally or alternatively, comparing the first model structure and the second model structure, may further comprise determining a first frequency of a first threat model contribution of the first hierarchy of threat model contributions, wherein the first frequency indicates when the first threat model contribution was last updated. The system may then determine a second frequency of a second threat model contribution of the second hierarchy of threat model contributions, wherein the first frequency indicates when the second threat model contribution was last updated. The system may then compare the first frequency to the second frequency. The system may then determine the comparison data based on comparing the first frequency to the second frequency.

Additionally or alternatively, comparing the first model structure and the second model structure, may further comprise determining a first type of threat mitigated by a first threat model contribution of the first hierarchy of threat model contributions. The system may then determine a second type of threat mitigated by a second threat model contribution of the second hierarchy of threat model contributions. The system may then compare the first type of threat to the second type of threat. The system may then determine the comparison data based on comparing the first type of threat to the second type of threat.

Additionally or alternatively, comparing the first model structure and the second model structure, may further comprise determining a first number of threats mitigated by a first threat model contribution of the first hierarchy of threat model contributions. The system may then determine a second number of threats mitigated by a second threat model contribution of the second hierarchy of threat model contributions. The system may then compare the first number of threats to the second number of threats. The system may then determine the comparison data based on comparing the first number of threats to the second number of threats.

At step 910, process 900 generates (e.g., using control circuitry of one or more components of system 300 (FIG. 3)) comparison data. For example, the system may in response to comparing the first model structure and the second model structure, generate for display, on the user interface, comparison data, wherein the comparison data describes, in a human-readable format, a relationship of the second model structure to the first model structure. For example, the system may determinate information based on a comparison of semantic relationships between data characteristics, data entity attributes, and relationships between data instances in order to update the threat modeling system. Additionally or alternatively, the system may generate other data simultaneously with, or in conjunction to, generate for display, on the user interface, recommendation data, wherein the recommendation data describes, in a human-readable format, an update recommendation for the second model structure based on the first model structure.

In some embodiments, the system may customize the comparison data based on the user. For example, the system may retrieve a user profile for the first user. The system may determine a type of comparison data for display in the user interface based on the user profile. The system may select the comparison data based on the type of comparison data.

It is contemplated that the steps or descriptions of FIG. 9 may be used with any other embodiment of this disclosure. In addition, the steps and descriptions described in relation to FIG. 9 may be done in alternative orders, or in parallel to further the purposes of this disclosure. For example, each of these steps may be performed in any order, in parallel, or simultaneously to reduce lag, or increase the speed of the system or method. Furthermore, it should be noted that any of the devices or equipment discussed in relation to FIGS. 1-5 could be used to perform one of more of the steps in FIG. 9.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for generating recommendations based on threat model knowledge graphs comprising crowdsourced modeling contributions.

2. A method, the method comprising: receiving a first threat model contribution from a first user; receiving a second threat model contribution from a second user; and adding the first and second threat model contributions to a crowdsourced threat modeling system.

3. A method, the method comprising: receiving a first threat model contribution from a first user, wherein the first threat model contribution has a first contribution characteristic; determining, based on the first contribution characteristic, a first location in a threat model knowledge graph for the first threat model contribution; receiving a second threat model contribution from a second user, wherein the second threat model contribution has a second contribution characteristic; determining, based on the second contribution characteristic, a second location in the threat model knowledge graph for the second threat model contribution; adding the first threat model contribution and the second threat model contribution to the threat model knowledge graph at the first location and the second location, respectively; in response to adding the first threat model contribution and the second threat model contribution to the threat model knowledge graph, updating a first threat modeling system; and generating for display, in a user interface, a recommendation based on the first threat modeling system, wherein the recommendation compares the first threat modeling system to a second threat modeling system.

4. A method, the method comprising: receiving, via a user interface, a user request to generate an integrated data structure for an integrated threat modeling system, wherein the integrated data structure defines an integrated ontology for a threat model knowledge graph of the integrated threat modeling system and a non-integrated threat model contribution; retrieving, using control circuitry, a first data structure for the integrated threat modeling system, wherein the first data structure defines a first ontology for the threat model knowledge graph at a first node; retrieving, using the control circuitry, a second data structure for the non-integrated threat model contribution, wherein the second data structure defines a second ontology for the non-integrated threat model contribution; generating, using the control circuitry, a data structure node for the integrated data structure at the first node based on the first data structure and the second data structure, wherein the data structure node is shared by the first data structure and the second data structure in the integrated data structure; in response to generating the data structure node, determining integration data, for the data structure node, that maps the first ontology to the second ontology; and generating for display, on the user interface, a recommendation based on the integrated data structure for the integrated threat modeling system.

5. A method, the method comprising: receiving, via a user interface, a user request from a first user to access an integrated threat modeling system comprising a threat model knowledge graph, wherein the threat model knowledge graph defines an integrated hierarchy of threat model contributions for the integrated threat modeling system, and wherein the integrated hierarchy of threat model contributions comprises threat model contributions from a plurality of sources; retrieving, using control circuitry, a first model structure for a portion of the integrated threat modeling system, wherein the first model structure defines a first hierarchy of threat model contributions for the portion of the integrated threat modeling system; retrieving, using the control circuitry, a second model structure for a non-integrated threat modeling system, wherein the second model structure defines a second hierarchy of threat model contributions for the non-integrated threat modeling system; comparing, using control circuitry, the first model structure and the second model structure; and in response to comparing the first model structure and the second model structure, generating for display, on the user interface, comparison data, wherein the comparison data describes, in a human-readable format, a relationship of the second model structure to the first model structure.

6. The method of any one of the preceding claims, wherein the first contribution characteristic indicates a first software architecture upon which the first threat model contribution is based, and wherein the second contribution characteristic indicates a second software architecture upon which the second threat model contribution is based.

7. The method of any one of the preceding claims, wherein the first contribution characteristic indicates a first mitigation technique upon which the first threat model contribution is based, and wherein the second contribution characteristic indicates a second mitigation technique upon which the second threat model contribution is based.

8. The method of any one of the preceding claims, wherein the first contribution characteristic indicates a first data flow upon which the first threat model contribution is based, and wherein the second contribution characteristic indicates a second data flow upon which the second threat model contribution is based.

9. The method of any one of the preceding claims, wherein determining, based on the first contribution characteristic, the first location, further comprises: retrieving a first contribution characteristic keyword for the first contribution characteristic; retrieving a second contribution characteristic keyword for available locations in the threat model knowledge graph; determining a first similarity between the first contribution characteristic keyword and the second contribution characteristic keyword; comparing the first similarity to a threshold similarity; and determining that the first contribution characteristic keyword and the second contribution characteristic keyword correspond based on the first similarity equaling or exceeding the threshold similarity.

10. The method of any one of the preceding claims, further comprising: determining a third location in the threat model knowledge graph that is unpopulated; retrieving a third contribution characteristic for the third location; identifying a third user corresponding to the third contribution characteristic; and transmitting a request to the third user for a third threat model contribution for adding to the threat model knowledge graph at the third location.

11. The method of any one of the preceding claims, further comprising: receiving a third threat model contribution, wherein the third threat model contribution has a third contribution characteristic; inputting the third threat model contribution into a machine learning model, wherein the machine learning model is trained to selection locations for adding threat model contributions to the threat model knowledge graph; and receiving an output of the machine learning model indicating a third location for adding the third threat model contribution to the threat model knowledge graph.

12. The method of any one of the preceding claims, wherein updating the first threat modeling system comprises: receiving a first user characteristic for the first user; comparing the first user characteristic to user characteristics required for updating the first threat modeling system; and validating the first threat model contribution at the first location based on the first user characteristic corresponding to user characteristics required for updating the first threat modeling system.

13. The method of any one of the preceding claims, wherein updating the first threat modeling system comprises: generating for display, in the user interface, a request to add the first threat model contribution to the threat model knowledge graph; receiving a number of user confirmations for adding the first threat model contribution to the threat model knowledge graph; comparing the number of user confirmations to a threshold number; and validating the first threat model contribution based on the number of user confirmations corresponding to the threshold number.

14. The method of any one of the preceding claims, wherein the first threat model contribution comprises first content for publishing in the first threat modeling system, and wherein the second threat model contribution comprises second content for publishing in the first threat modeling system.

15. The method of any one of the preceding claims, wherein the first ontology describes a first type of software architecture at the first node of the threat model knowledge graph, and wherein the second ontology describes a second type of software architecture of the non-integrated threat model contribution, and wherein the integration data maps the first type of software architecture to the second type of software architecture.

16. The method of any one of the preceding claims, wherein the first ontology describes a first type of data flow at the first node of the threat model knowledge graph, and wherein the second ontology describes a second type of data flow of the non-integrated threat model contribution, and wherein the integration data maps the first type of data flow to the second type of data flow.

17. The method of any one of the preceding claims, wherein the first ontology describes a first type of threat addressed at the first node of the threat model knowledge graph, and wherein the second ontology describes a second type of threat addressed by the non-integrated threat model contribution, and wherein the integration data maps the first type of threat to the second type of threat.

18. The method of any one of the preceding claims, wherein the first ontology describes a first type of mitigation technique corresponding to the first node of the threat model knowledge graph, and wherein the second ontology describes a second type of mitigation technique corresponding to the non-integrated threat model contribution, and wherein the integration data maps the first type of mitigation technique to the second type of mitigation technique.

19. The method of any one of the preceding claims, further comprising: in response to receiving the user request to generate the integrated data structure, determining that the integrated data structure comprises the first data structure and the second data structure; and in response to determining that the integrated data structure comprises the first data structure and the second data structure, accessing: a first remote issue link to a first server housing the first data structure; and a second remote issue link to a second server housing the first data structure.

20. The method of any one of the preceding claims, wherein generating the integration data further comprises: determining the first ontology; determining the second ontology; and determining a rule set for automatically mapping the first ontology to the second ontology.

21. The method of any one of the preceding claims, further comprising: retrieving first content from the first ontology; retrieving second content from the second ontology; determining a semantic closeness between the first content and the second content; comparing the semantic closeness to a threshold semantic closeness; determining that first content and the second content correspond based on the semantic closeness equaling or exceeding the threshold semantic closeness; and determining to integrate the integrated threat modeling system and the non-integrated threat model contribution at the first node based on the semantic closeness equaling or exceeding the threshold semantic closeness.

22. The method of any one of the preceding claims, further comprising: retrieving first content from the first ontology; determining a keyword in the first content; comparing the keyword to a list of keywords corresponding to the second ontology; and determining to integrate the integrated threat modeling system and the non-integrated threat model contribution at the first node based on comparing the keyword to the list of keywords corresponding to the second ontology.

23. The method of any one of the preceding claims, further comprising: receiving a user edit to the integration data; and storing the edited integration data.

24. The method of any one of the preceding claims, wherein comparing the first model structure and the second model structure, further comprises: determining a first author of a first threat model contribution of the first hierarchy of threat model contributions; determining a second author of a second threat model contribution of the second hierarchy of threat model contributions; comparing a first characteristic of the first author to a second characteristic of the second author; and determining the comparison data based on comparing the first characteristic of the first author to the second characteristic of the second author.

25. The method of any one of the preceding claims, wherein the first characteristic comprises a level of technical diversity of the first author, and wherein the second characteristic comprises a level of technical diversity of the second author.

26. The method of any one of the preceding claims, wherein comparing the first model structure and the second model structure, further comprises: determining a first frequency of a first threat model contribution of the first hierarchy of threat model contributions, wherein the first frequency indicates when the first threat model contribution was last updated; determining a second frequency of a second threat model contribution of the second hierarchy of threat model contributions, wherein the first frequency indicates when the second threat model contribution was last updated; comparing the first frequency to the second frequency; and determining the comparison data based on comparing the first frequency to the second frequency.

27. The method of any one of the preceding claims, wherein comparing the first model structure and the second model structure, further comprises: determining a first type of threat mitigated by a first threat model contribution of the first hierarchy of threat model contributions; determining a second type of threat mitigated by a second threat model contribution of the second hierarchy of threat model contributions; comparing the first type of threat to the second type of threat; and determining the comparison data based on comparing the first type of threat to the second type of threat.

28. The method of any one of the preceding claims, wherein comparing the first model structure and the second model structure, further comprises: determining a first number of threats mitigated by a first threat model contribution of the first hierarchy of threat model contributions; determining a second number of threats mitigated by a second threat model contribution of the second hierarchy of threat model contributions; comparing the first number of threats to the second number of threats; and determining the comparison data based on comparing the first number of threats to the second number of threats.

29. The method of any one of the preceding claims, further comprising generating for display, on the user interface, recommendation data, wherein the recommendation data describes, in a human-readable format, an update recommendation for the second model structure based on the first model structure.

30. The method of any one of the preceding claims, further comprising: retrieving a user profile for the first user; determining a type of comparison data for display in the user interface based on the user profile; and selecting the comparison data based on the type of comparison data.

31. The method of any one of the preceding claims, wherein each threat model contribution of the threat model contributions for the integrated threat modeling system corresponds to an integrated data structure, and wherein each integrated data structure defines an integrated ontology mapping a first ontology for a first threat model contribution to a second ontology for a second threat model contribution.

32. The method of any one of the preceding claims, wherein the first ontology describes a first type of software architecture of the first threat model contribution, and wherein the second ontology describes a second type of software architecture of the second threat model contribution.

33. A tangible, non-transitory, machine-readable medium storing instructions that, when executed by a data processing apparatus, cause the data processing apparatus to perform operations comprising those of any of embodiments 1-32.

34. A system comprising: one or more processors and memory storing instructions that, when executed by the processors, cause the processors to effectuate operations comprising those of any of embodiments 1-32.

35. A system comprising means for performing any of embodiments 1-32.

What is claimed is:

1. A system for generating recommendations based on threat model knowledge graphs comprising crowdsourced modeling contributions, the system comprising:
cloud-based storage circuitry configured to store a threat model knowledge graph, wherein the threat model knowledge graph is a graph-structured data model for integrating threat model contributions;
control circuitry configured to:
receive a first threat model contribution from a first user, wherein the first threat model contribution has a first contribution characteristic, and wherein the first threat model contribution comprises first content for publishing in a first threat modeling system;
determine, based on the first contribution characteristic, a first location in the threat model knowledge graph for the first threat model contribution;
receive a second threat model contribution from a second user, wherein the second threat model contribution has a second contribution characteristic, and wherein the second threat model contribution comprises second content for publishing in the first threat modeling system;
determine, based on the second contribution characteristic, a second location in the threat model knowledge graph for the second threat model contribution;
add the first threat model contribution and the second threat model contribution to the threat model knowledge graph at the first location and the second location, respectively;
in response to adding the first threat model contribution and the second threat model contribution to the threat model knowledge graph, update a threat modeling system based on the threat model knowledge graph;
receive a user request for a recommendation based on the threat modeling system, wherein the recommendation compares the first threat modeling system to a second threat modeling system; and
input/output circuitry configured to:
generate for display, in a user interface, the recommendation.

2. A method of generating recommendations based on threat model knowledge graphs comprising crowdsourced modeling contributions, the method comprising:
receiving a first threat model contribution from a first user, wherein the first threat model contribution has a first contribution characteristic;
determining, based on the first contribution characteristic, a first location in a threat model knowledge graph for the first threat model contribution;
receiving a second threat model contribution from a second user, wherein the second threat model contribution has a second contribution characteristic;
determining, based on the second contribution characteristic, a second location in the threat model knowledge graph for the second threat model contribution;
adding the first threat model contribution and the second threat model contribution to the threat model knowledge graph at the first location and the second location, respectively;
in response to adding the first threat model contribution and the second threat model contribution to the threat model knowledge graph, updating a first threat modeling system based on the threat model knowledge graph; and generating for display, in a user interface, a recommendation based on the first threat modeling system, wherein the recommendation compares the first threat modeling system to a second threat modeling system.

3. The method of claim 2, wherein the first contribution characteristic indicates a first software architecture upon which the first threat model contribution is based, and wherein the second contribution characteristic indicates a second software architecture upon which the second threat model contribution is based.

4. The method of claim 2, wherein the first contribution characteristic indicates a first mitigation technique upon which the first threat model contribution is based, and wherein the second contribution characteristic indicates a second mitigation technique upon which the second threat model contribution is based.

5. The method of claim 2, wherein the first contribution characteristic indicates a first data flow upon which the first threat model contribution is based, and wherein the second contribution characteristic indicates a second data flow upon which the second threat model contribution is based.

6. The method of claim 2, wherein determining, based on the first contribution characteristic, the first location, further comprises:
    retrieving a first contribution characteristic keyword for the first contribution characteristic;
    retrieving a second contribution characteristic keyword for available locations in the threat model knowledge graph;
    determining a first similarity between the first contribution characteristic keyword and the second contribution characteristic keyword;
    comparing the first similarity to a threshold similarity; and
    determining that the first contribution characteristic keyword and the second contribution characteristic keyword correspond based on the first similarity equaling or exceeding the threshold similarity.

7. The method of claim 2, further comprising:
    determining a third location in the threat model knowledge graph that is unpopulated;
    retrieving a third contribution characteristic for the third location;
    identifying a third user corresponding to the third contribution characteristic; and
    transmitting a request to the third user for a third threat model contribution for adding to the threat model knowledge graph at the third location.

8. The method of claim 2, further comprising:
    receiving a third threat model contribution, wherein the third threat model contribution has a third contribution characteristic;
    inputting the third threat model contribution into a machine learning model, wherein the machine learning model is trained to selection locations for adding threat model contributions to the threat model knowledge graph; and
    receiving an output of the machine learning model indicating a third location for adding the third threat model contribution to the threat model knowledge graph.

9. The method of claim 2, wherein updating the first threat modeling system comprises:
    receiving a first user characteristic for the first user;
    comparing the first user characteristic to user characteristics required for updating the first threat modeling system; and
    validating the first threat model contribution at the first location based on the first user characteristic corresponding to user characteristics required for updating the first threat modeling system.

10. The method of claim 2, wherein updating the first threat modeling system comprises:
    generating for display, in the user interface, a request to add the first threat model contribution to the threat model knowledge graph;
    receiving a number of user confirmations for adding the first threat model contribution to the threat model knowledge graph;
    comparing the number of user confirmations to a threshold number; and
    validating the first threat model contribution based on the number of user confirmations corresponding to the threshold number.

11. The method of claim 2, wherein the first threat model contribution comprises first content for publishing in the first threat modeling system, and wherein the second threat model contribution comprises second content for publishing in the first threat modeling system.

12. A non-transitory, computer-readable medium for generating recommendations based on threat model knowledge graphs comprising crowdsourced modeling contributions, comprising instructions that, when executed by one or more processors, cause operations comprising:
    receiving a first threat model contribution from a first user, wherein the first threat model contribution has a first contribution characteristic;
    determining, based on the first contribution characteristic, a first location in a threat model knowledge graph for the first threat model contribution;
    receiving a second threat model contribution from a second user, wherein the second threat model contribution has a second contribution characteristic;
    determining, based on the second contribution characteristic, a second location in the threat model knowledge graph for the second threat model contribution;
    adding the first threat model contribution and the second threat model contribution to the threat model knowledge graph at the first location and the second location, respectively;
    in response to adding the first threat model contribution and the second threat model contribution to the threat model knowledge graph, updating a first threat modeling system based on the threat model knowledge graph; and
    generating for display, in a user interface, a recommendation based on the first threat modeling system, wherein the recommendation compares the first threat modeling system to a second threat modeling system.

13. The non-transitory, computer-readable medium of claim 12, wherein the first contribution characteristic indicates a first software architecture upon which the first threat model contribution is based, and wherein the second contribution characteristic indicates a second software architecture upon which the second threat model contribution is based.

14. The non-transitory, computer-readable medium of claim 12, wherein the first contribution characteristic indicates a first mitigation technique upon which the first threat model contribution is based, and wherein the second contribution characteristic indicates a second mitigation technique upon which the second threat model contribution is based.

15. The non-transitory, computer-readable medium of claim 12, wherein the first contribution characteristic indicates a first data flow upon which the first threat model contribution is based, and wherein the second contribution characteristic indicates a second data flow upon which the second threat model contribution is based.

16. The non-transitory, computer-readable medium of claim 12, wherein determining, based on the first contribution characteristic, the first location, further comprises:
retrieving a first contribution characteristic keyword for the first contribution characteristic;
retrieving a second contribution characteristic keyword for available locations in the threat model knowledge graph;
determining a first similarity between the first contribution characteristic keyword and the second contribution characteristic keyword;
comparing the first similarity to a threshold similarity; and
determining that the first contribution characteristic keyword and the second contribution characteristic keyword correspond based on the first similarity equaling or exceeding the threshold similarity.

17. The non-transitory, computer-readable medium of claim 12, wherein the instructions further cause operations comprising:
determining a third location in the threat model knowledge graph that is unpopulated;
retrieving a third contribution characteristic for the third location;
identifying a third user corresponding to the third contribution characteristic; and
transmitting a request to the third user for a third threat model contribution for adding to the threat model knowledge graph at the third location.

18. The non-transitory, computer-readable medium of claim 12, wherein the instructions further cause operations comprising:
receiving a third threat model contribution, wherein the third threat model contribution has a third contribution characteristic;
inputting the third threat model contribution into a machine learning model, wherein the machine learning model is trained to selection locations for adding threat model contributions to the threat model knowledge graph; and
receiving an output of the machine learning model indicating a third location for adding the third threat model contribution to the threat model knowledge graph.

19. The non-transitory, computer-readable medium of claim 12, wherein updating the first threat modeling system comprises:
receiving a first user characteristic for the first user;
comparing the first user characteristic to user characteristics required for updating the first threat modeling system; and
validating the first threat model contribution at the first location based on the first user characteristic corresponding to user characteristics required for updating the first threat modeling system.

20. The non-transitory, computer-readable medium of claim 12, wherein updating the first threat modeling system comprises:
generating for display, in the user interface, a request to add the first threat model contribution to the threat model knowledge graph;
receiving a number of user confirmations for adding the first threat model contribution to the threat model knowledge graph;
comparing the number of user confirmations to a threshold number; and
validating the first threat model contribution based on the number of user confirmations corresponding to the threshold number.

\* \* \* \* \*